US011916282B2

(12) United States Patent
Wu et al.

(10) Patent No.: US 11,916,282 B2
(45) Date of Patent: Feb. 27, 2024

(54) COUPLING ANTENNA APPARATUS AND ELECTRONIC DEVICE

(71) Applicant: HUAWEI TECHNOLOGIES CO., LTD., Guangdong (CN)

(72) Inventors: Pengfei Wu, Shanghai (CN); Chien-Ming Lee, Shenzhen (CN); Dong Yu, Shanghai (CN); Chih Yu Tsai, Taiwan (CN); Chih-Hua Chang, Taiwan (CN); Arun Sowpati, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 17/290,904

(22) PCT Filed: Nov. 5, 2019

(86) PCT No.: PCT/CN2019/115493
§ 371 (c)(1),
(2) Date: May 3, 2021

(87) PCT Pub. No.: WO2020/093985
PCT Pub. Date: May 14, 2020

(65) Prior Publication Data

US 2021/0376452 A1 Dec. 2, 2021

(30) Foreign Application Priority Data

Nov. 6, 2018 (CN) ......................... 201811312284.2
Nov. 15, 2018 (CN) ......................... 201811362920.2

(51) Int. Cl.
*H01Q 1/24* (2006.01)
*H01Q 5/35* (2015.01)
(Continued)

(52) U.S. Cl.
CPC ............... *H01Q 1/243* (2013.01); *H01Q 1/22* (2013.01); *H01Q 1/242* (2013.01); *H01Q 1/244* (2013.01); *H01Q 5/357* (2015.01); *H01Q 13/10* (2013.01)

(58) Field of Classification Search
CPC ........ H01Q 1/243; H01Q 5/357; H01Q 13/10; H01Q 5/328; H01Q 7/00; H01Q 1/48;
(Continued)

(56) References Cited

U.S. PATENT DOCUMENTS 8,368,602 B2 * 2/2013 Hill ........................ H01Q 9/285 343/702
8,698,677 B2 * 4/2014 Bungo ..................... H01Q 9/42 343/893
(Continued)

FOREIGN PATENT DOCUMENTS

CN 101958454 A 1/2011
CN 101958455 A 1/2011
(Continued)

OTHER PUBLICATIONS

Chinese Office Action for Application No. 201980073182.6 dated Nov. 23, 2021, 12 pages.
(Continued)

*Primary Examiner* — Vibol Tan

(57) ABSTRACT

An antenna apparatus includes a feeding antenna inside an electronic device and one or more antenna elements, such as a floating metal antenna, disposed on a rear cover of the electronic device. The floating metal antenna and a feeding antenna inside the electronic device may form a coupling antenna structure. The feeding antenna may be an antenna fastened on an antenna support (which may be referred to as a support antenna). The feeding antenna may alternatively be a slot antenna formed by slitting on a metal middle frame of the electronic device. The antenna apparatus may be
(Continued)

implemented in limited design space, thereby effectively saving antenna design space inside the electronic device. The antenna apparatus may generate excitation of a plurality of resonance modes, so that antenna bandwidth and radiation characteristics can be improved.

20 Claims, 34 Drawing Sheets

(51) Int. Cl.
*H01Q 5/357* (2015.01)
*H01Q 13/10* (2006.01)
*H01Q 1/22* (2006.01)

(58) Field of Classification Search
CPC ........ H01Q 5/307; H01Q 5/321; H01Q 5/385; H01Q 5/40; H01Q 1/244; H01Q 1/36; H01Q 1/38; H01Q 1/50; H01Q 5/10; H01Q 1/22; H01Q 1/44
See application file for complete search history.

(56) References Cited

U.S. PATENT DOCUMENTS

| | | | | |
|---|---|---|---|---|
| 9,203,141 | B1 * | 12/2015 | Su | H01Q 1/243 |
| 9,484,633 | B2 * | 11/2016 | Oh | H01Q 21/0087 |
| 9,882,284 | B2 * | 1/2018 | Eom | H01Q 1/243 |
| 10,122,069 | B2 * | 11/2018 | Ghit | H01Q 1/243 |
| 10,249,936 | B2 * | 4/2019 | Sayama | H01Q 1/241 |
| 10,403,971 | B2 * | 9/2019 | Yu | H01Q 9/42 |
| 10,741,904 | B2 * | 8/2020 | Kim | H01Q 5/307 |
| 11,043,734 | B2 * | 6/2021 | Ha | H01Q 1/48 |
| 2003/0058168 | A1 | 3/2003 | Sadler et al. | |
| 2008/0001837 | A1 | 1/2008 | Liu | |
| 2008/0257662 | A1 | 10/2008 | Kunz | |
| 2011/0248895 | A1 * | 10/2011 | Bungo | H01Q 9/40 343/702 |
| 2011/0300907 | A1 | 12/2011 | Hill et al. | |
| 2013/0257662 | A1 | 10/2013 | Eom et al. | |
| 2013/0335275 | A1 * | 12/2013 | Sanford | H01Q 1/42 343/702 |
| 2015/0171508 | A1 | 6/2015 | Jeon et al. | |
| 2015/0295314 | A1 * | 10/2015 | Oh | H01Q 5/378 343/866 |
| 2016/0351998 | A1 | 12/2016 | Ahn et al. | |
| 2017/0194692 | A1 | 7/2017 | Sayama et al. | |

FOREIGN PATENT DOCUMENTS

| | | | |
|---|---|---|---|
| CN | 102255134 | A | 11/2011 |
| CN | 203134978 | U | 8/2013 |
| CN | 103633426 | A | 3/2014 |
| CN | 104167592 | A | 11/2014 |
| CN | 105552550 | A | 5/2016 |
| CN | 105762519 | A | 7/2016 |
| CN | 105789884 | A | 7/2016 |
| CN | 105870592 | A | 8/2016 |
| CN | 106207440 | A | 12/2016 |
| CN | 106505307 | A | 3/2017 |
| CN | 107565209 | A | 1/2018 |
| CN | 108172972 | A | 6/2018 |
| CN | 108232442 | A | 6/2018 |
| CN | 108258425 | A | 7/2018 |
| CN | 108321523 | A | 7/2018 |
| CN | 207572519 | U | 7/2018 |
| CN | 108470978 | A | 8/2018 |
| EP | 1063721 | A1 | 12/2000 |
| JP | 2005218032 | A | 8/2005 |
| JP | 2012120038 | A | 6/2012 |
| JP | 6061735 | B2 | 1/2017 |
| WO | 2016052733 | A1 | 4/2016 |
| WO | 2018138580 | A1 | 8/2018 |
| WO | 2018198981 | A1 | 11/2018 |

OTHER PUBLICATIONS

Japanese Office Action for Application No. 2021-523624 dated Aug. 23, 2022, 9 pages.
Chinese Office Action for Application No. 201811362920 dated Feb. 8, 2023, 10 pages.
Office Action issued in CN202010252342.8, dated Sep. 29, 2020, 9 pages.
Office Action issued in CN202010252342.8, dated May 10, 2021, 5 pages.
Extended European Search Report issued in EP19882615.8, dated Oct. 29, 2021, 11 pages.
International Search Report and Written Opinion issued in PCT/CN2019/115493, dated Jan. 23, 2020, 8 pages.
Japanese Office Action for Application No. 2021-523624 dated Apr. 20, 2022 with English Translation, 23 pages.

* cited by examiner

COUPLING ANTENNA APPARATUS AND ELECTRONIC DEVICE

CROSS-REFERENCE TO RELATED APPLICATIONS

This application is a National Stage of International Application No. PCT/CN2019/115493, filed on Nov. 5, 2019, which claims priority to Chinese Patent Application No. 201811362920.2, filed on Nov. 15, 2018, which claims priority to Chinese Patent Application No. 201811312284.2, filed on Nov. 6, 2018. All of the aforementioned applications are hereby incorporated by reference in their entireties.

TECHNICAL FIELD

The present disclosure relates to the field of antenna technologies, and in particular, to a coupling antenna apparatus applied to an electronic device.

BACKGROUND

With development of communications technologies, multiple-input multiple-output (MIMO) antenna technology is more widely applied to electronic devices, the number of antennas increases exponentially, and increasing amounts of frequency bands are covered. Electronic device products, especially electronic devices of a metal industry design (ID), still require very high structural compactness. However, a recent design trend of an electronic devices is towards a higher screen-to-body ratio, more multimedia components, and a larger battery capacity. These designs greatly compress antenna space. The sharply compressed antenna space causes many conventional antenna designs, such as a flexible printed circuit (FPC) antenna or a laser direct structuring (LDS) antenna on an antenna support, to fail to meet antenna performance requirements.

Currently, in terms of an electronic device with a metal frame and a glass rear cover ID, in a conventional design solution of a MIMO antenna, such as a MIMO antenna in a wireless fidelity (Wi-Fi) frequency band (which may also be referred to as a Wi-Fi MIMO antenna), the antenna is usually designed on an antenna support that bypasses an internal metal component and a metal frame and that is higher than the metal frame.

For example, a dashed-line box area in FIG. 1 is a design area of a currently commonly used Wi-Fi MIMO antenna support. As a volume of a surrounding component (for example, a camera) increases, antenna space is further compressed, and a height is limited. In this case, designing an inverted-F antenna (IFA) on the antenna support can no longer meet bandwidth requirements of a Wi-Fi 2.4 GHz frequency band and a Wi-Fi 5 GHz frequency band.

Therefore, improved designs for an antenna in limited space to meet a performance requirement of the antenna is a research direction in the industry.

SUMMARY

Embodiments of the present invention provide a coupling antenna apparatus and an electronic device. The coupling antenna apparatus may be implemented in limited design space, and may generate excitation of a plurality of resonance modes, so that antenna bandwidth and radiation characteristics can be improved.

According to a first aspect, this application provides a coupling antenna apparatus applied to an electronic device.

The electronic device may include a printed circuit board PCB, a metal middle frame, and a rear cover, and the PCB may be located between the rear cover and the metal middle frame. The coupling antenna apparatus may include a feeding unit and a coupling unit. The feeding unit may have a feeding point, and the feeding unit may be coupled to the coupling unit to generate resonances of a plurality of frequency bands. The coupling unit may include one or more antenna elements disposed on the rear cover. The rear cover may be made of a material such as glass, ceramic, or plastic.

In this application, the feeding unit (which may also be referred to as a feeding antenna) may be an antenna fastened on an antenna support (which may be referred to as a support antenna). The support antenna may be in different types of antenna forms, such as an IFA antenna, a monopole antenna, or a loop antenna. The feeding unit may alternatively be a slot antenna formed by slitting on the metal middle frame.

In this application, the coupling unit (which may also be referred to as a coupling antenna) may include a floating metal antenna disposed on the rear cover. That is, the antenna element disposed on the rear cover may be a floating metal antenna disposed on the rear cover. The floating metal antenna may be disposed on an inner surface of the rear cover, or may be disposed on an outer surface of the rear cover, or may be embedded in the rear cover. For example, the floating metal antenna may be a metal strip pasted on an inner surface of the rear cover. Not limited to the floating metal antenna, the antenna element disposed on the rear cover may be another antenna element that is disposed on the rear cover and that can be coupled to radiate a signal.

It can be learned that the coupling antenna apparatus provided in the first aspect may include the antenna element (for example, a floating metal antenna) disposed on the rear cover. Design space of the antenna element (for example, a floating metal antenna) on the rear cover is sufficient, and a size of the antenna element may be designed to be relatively large. In this way, a coupling antenna structure formed by the antenna element (for example, a floating metal antenna) and the feeding antenna can excite a resonance mode of a lower frequency band, generate more resonances, and implement coverage of more frequency bands. In addition, a size of the feeding antenna included in the coupling antenna apparatus may be designed to be very small, and impact of a surrounding component is reduced. This can be implemented in relatively small design space.

With reference to the first aspect, in some embodiments, the coupling antenna apparatus may be specifically implemented in the following several manners.

In a first manner, the feeding unit of the coupling antenna apparatus may be a feeding support antenna. The coupling unit of the coupling antenna apparatus may include an antenna element (for example, a floating metal antenna) disposed on the rear cover, and may further include a slot antenna formed by a slotted metal middle frame. The slot antenna may have both ends being closed and grounded. The antenna element (for example, a floating metal antenna) disposed on the rear cover may have both ends being open. The support antenna may have one end feeding power, and the other end being open. The feeding support antenna may be coupled to one or more antenna elements (for example, a floating metal antenna) disposed on the rear cover and the slot antenna to generate resonances of a plurality of frequency bands. The resonances of the plurality of frequency bands may include resonances of a plurality of Wi-Fi frequency bands. Optionally, the Wi-Fi frequency band may include one or more of the following: a 2.4 GHz frequency band and a 5 GHz frequency band.

In an example implementation, only one antenna element (for example, a floating metal antenna) may be disposed on the rear cover. In this case, the coupling antenna apparatus may generate one resonance (which may be referred to as a resonance 1) in the 2.4 GHz frequency band, and three resonances (which may be resonances 2, 3, and 4) in the 5 GHz frequency band. One resonance (the resonance 1) in the 2.4 GHz frequency band may be generated in a half-wavelength mode of the antenna element (for example, a floating metal antenna) disposed on the rear cover. A lowest resonance (the resonance 2) in the three resonances in the 5 GHz frequency band may be generated in a one-time wavelength mode of the antenna element (for example, a floating metal antenna) disposed on the rear cover. An intermediate resonance (the resonance 3) in the three resonances in the 5 GHz frequency band may be generated by the feeding support antenna (for example, in a quarter-wavelength mode). A highest resonance (the resonance 4) in the three resonances in the 5 GHz frequency band may be generated in a half-wavelength mode of the slot antenna.

In other words, the feeding support antenna may generate the resonance 3, and may be coupled to the floating metal antenna, to excite the floating metal antenna to generate the resonance 1 and the resonance 2, or may be coupled to the slot antenna, and to excite the slot antenna to generate the resonance 4.

A wavelength mode in which the antenna element (for example, a floating metal antenna) disposed on the rear cover generates the resonance 1 is not limited, and the resonance 1 may alternatively be generated in a one-time wavelength mode, a three-half-wavelength mode, or the like of the antenna element (for example, a floating metal antenna) disposed on the rear cover. A wavelength mode in which the antenna element (for example, a floating metal antenna) disposed on the rear cover generates the resonance 2 is not limited, and the resonance 2 may alternatively be generated in a three-half-wavelength mode, a five-half-wavelength mode, or the like of the antenna element (for example, a floating metal antenna) disposed on the rear cover. A wavelength mode in which the support antenna generates the resonance 3 is not limited, and the resonance 3 may alternatively be generated in a three-quarter-wavelength mode, a five-quarter-wavelength mode, or the like of the support antenna. A wavelength mode in which the slot antenna generates the resonance 4 is not limited, and the resonance 4 may alternatively be generated in a three-half-wavelength mode, a five-half-wavelength mode, or the like of the slot antenna.

In some example implementations, the slot antenna may have one end being closed and grounded, and the other end being open. In this case, the slot antenna may generate the resonance 4 in a quarter-wavelength mode, a three-quarter-wavelength mode, a five-quarter-wavelength mode, or the like.

It may be understood that when a plurality of antenna elements (for example, a floating metal antenna) are disposed on the rear cover, the coupling antenna apparatus implemented in the first manner may generate more resonances. For example, the coupling antenna apparatus may generate four resonances in the 5 GHz frequency band.

The coupling antenna apparatus implemented in the first manner may alternatively generate a resonance of another frequency band, not limited to the Wi-Fi frequency band such as the 2.4 GHz frequency band or the 5 GHz frequency band. This may be specifically set by adjusting a size or a shape of each antenna radiator (for example, the floating metal antenna, the support antenna, or the slot antenna) in the antenna structure.

In the coupling antenna apparatus implemented in the first manner, the feeding support antenna and the antenna element (for example, a floating metal antenna) disposed on the rear cover may be disposed in parallel and opposite to each other. The feeding support antenna and the slot antenna may be disposed in parallel and opposite to each other.

In a second manner, the feeding unit of the coupling antenna apparatus may be a feeding support antenna. The coupling unit of the coupling antenna apparatus may be one or more antenna elements (for example, a floating metal antenna) disposed on the rear cover. The antenna element (for example, a floating metal antenna) disposed on the rear cover may have both ends being open. The support antenna may have one end feeding power, and the other end being open. The feeding support antenna may be coupled to one or more antenna elements (for example, a floating metal antenna) disposed on the rear cover to generate resonances of a plurality of frequency bands. The resonances of the plurality of frequency bands may include resonances of a plurality of Wi-Fi frequency bands. Optionally, the Wi-Fi frequency band may include one or more of the following: a 2.4 GHz frequency band and a 5 GHz frequency band.

In an example implementation, only one antenna element (for example, a floating metal antenna) may be disposed on the rear cover. In this case, the coupling antenna apparatus may generate one resonance (which may be referred to as a resonance 5) in the 2.4 GHz frequency band, and two resonances (which may be resonances 6 and 7) in the 5 GHz frequency band. One resonance (the resonance 5) in the 2.4 GHz frequency band may be generated in a half-wavelength mode of the antenna element (for example, a floating metal antenna) disposed on the rear cover. A lower resonance (the resonance 6) of the two resonances in the 5 GHz frequency band may be generated in a one-time wavelength mode of the antenna element (for example, a floating metal antenna) disposed on the rear cover. A higher resonance (the resonance 7) of the two resonances in the 5 GHz frequency band may be generated by the feeding support antenna (for example, in a quarter-wavelength mode).

In other words, the feeding support antenna may generate the resonance 7, and may be coupled to the floating metal antenna, to excite the floating metal antenna to generate the resonance 5 and the resonance 6.

A wavelength mode in which the antenna element (for example, a floating metal antenna) disposed on the rear cover generates the resonance 5 is not limited, and the resonance 5 may alternatively be generated in a one-time wavelength mode, a three-half-wavelength mode, or the like of the antenna element (for example, a floating metal antenna) disposed on the rear cover. A wavelength mode in which the antenna element (for example, a floating metal antenna) disposed on the rear cover generates the resonance 6 is not limited, and the resonance 6 may alternatively be generated in a three-half-wavelength mode, a five-half-wavelength mode, or the like of the antenna element (for example, a floating metal antenna) disposed on the rear cover. A wavelength mode in which the support antenna generates the resonance 7 is not limited, and the resonance 7 may alternatively be generated in a three-quarter-wavelength mode, a five-quarter-wavelength mode, or the like of the support antenna.

The coupling antenna apparatus implemented in the second manner may alternatively generate a resonance of another frequency band, not limited to the Wi-Fi frequency band such as the 2.4 GHz frequency band or the 5 GHz frequency band. This may be specifically set by adjusting a size or a shape of each antenna radiator (for example, the floating metal antenna or the support antenna) in the antenna structure.

It may be understood that when a plurality of antenna elements (for example, a floating metal antenna) are disposed on the rear cover, the coupling antenna apparatus implemented in the second manner may generate more resonances. For example, the coupling antenna apparatus may generate three resonances in the 5 GHz frequency band.

In the coupling antenna apparatus implemented in the second manner, the feeding support antenna and the antenna element (for example, a floating metal antenna) disposed on the rear cover may be disposed in parallel and opposite to each other.

In a third manner, the feeding unit of the coupling antenna apparatus may be a feeding slot antenna. The coupling unit of the coupling antenna apparatus may include an antenna element (for example, a floating metal antenna) disposed on the rear cover, and may further include a support antenna fastened on an antenna support. The slot antenna may have one end feeding power, and the other end being closed and grounded. The support antenna 31 may have one end being closed and grounded, and the other end being open. The floating metal antenna may have both ends being open. The feeding slot antenna may be coupled to one or more antenna elements (for example, a floating metal antenna) disposed on the rear cover and the support antenna to generate resonances of a plurality of frequency bands. The resonances of the plurality of frequency bands may include resonances of a plurality of Wi-Fi frequency bands. Optionally, the Wi-Fi frequency band may include one or more of the following: a 2.4 GHz frequency band and a 5 GHz frequency band.

In an example implementation, only one antenna element (for example, a floating metal antenna) may be disposed on the rear cover. In this case, same as in the first manner, the coupling antenna apparatus may generate one resonance (which may be referred to as a resonance 1) in the 2.4 GHz frequency band, and three resonances (which may be resonances 2, 3, and 4) in the 5 GHz frequency band. One resonance (the resonance 1) in the 2.4 GHz frequency band may be generated in a half-wavelength mode of the antenna element (for example, a floating metal antenna) disposed on the rear cover. A lowest resonance (the resonance 2) in the three resonances in the 5 GHz frequency band may be generated in a one-time wavelength mode of the antenna element (for example, a floating metal antenna) disposed on the rear cover. An intermediate resonance (the resonance 3) in the three resonances in the 5 GHz frequency band may be generated by the support antenna (for example, in a quarter-wavelength mode). A highest resonance (the resonance 4) in the three resonances in the 5 GHz frequency band may be generated in a half-wavelength mode of the feeding slot antenna.

In other words, the feeding slot antenna may generate a resonance 4, and may be coupled to the floating metal antenna, to excite the floating metal antenna to generate the resonance 1 and the resonance 2, or may be coupled to the support antenna, to excite the support antenna to generate the resonance 3.

For a resonance generated by the coupling antenna apparatus implemented in the third manner generates, refer to the resonance mode generated by the coupling antenna apparatus implemented in the first manner. Details are not described herein again.

In the coupling antenna apparatus implemented in the third manner, the feeding slot antenna and the antenna element disposed on the rear cover may be disposed in parallel and opposite to each other. The feeding slot antenna and the support antenna may be disposed in parallel and opposite to each other.

In a fourth manner, the feeding unit of the coupling antenna apparatus may be a feeding slot antenna. The coupling unit of the coupling antenna apparatus may be an antenna element (for example, a floating metal antenna) disposed on the rear cover. The slot antenna may have one end feeding power, and the other end being closed and grounded. The floating metal antenna may have both ends being open. The feeding slot antenna may be coupled to one or more antenna elements (for example, a floating metal antenna) disposed on the rear cover, to generate resonances of a plurality of frequency bands. The resonances of the plurality of frequency bands may include resonances of a plurality of Wi-Fi frequency bands. Optionally, the Wi-Fi frequency band may include one or more of the following: a 2.4 GHz frequency band and a 5 GHz frequency band.

In an example implementation, only one antenna element (for example, a floating metal antenna) may be disposed on the rear cover. In this case, the coupling antenna apparatus may generate one resonance (which may be referred to as a resonance 8) in the 2.4 GHz frequency band, and two resonances (which may be resonances 9 and 12) in the 5 GHz frequency band. One resonance (the resonance 8) in the 2.4 GHz frequency band may be generated in a half-wavelength mode of the antenna element (for example, a floating metal antenna) disposed on the rear cover. A lower resonance (the resonance 9) of the two resonances in the 5 GHz frequency band may be generated in a one-time wavelength mode of the antenna element (for example, a floating metal antenna) disposed on the rear cover. A higher resonance (the resonance 12) of the two resonances in the 5 GHz frequency band may be generated by the feeding slot antenna (for example, in a half-wavelength mode).

In other words, the feeding slot antenna may generate the resonance 12, and may be coupled to the floating metal antenna, to excite the floating metal antenna to generate the resonance 8 and the resonance 9.

A wavelength mode in which the antenna element (for example, a floating metal antenna) disposed on the rear cover generates the resonance 8 is not limited, and the resonance 8 may alternatively be generated in a one-time wavelength mode, a three-half-wavelength mode, or the like of the antenna element (for example, a floating metal antenna) disposed on the rear cover. A wavelength mode in which the antenna element (for example, a floating metal antenna) disposed on the rear cover generates the resonance 9 is not limited, and the resonance 9 may alternatively be generated in a three-half-wavelength mode, a five-half-wavelength mode, or the like of the antenna element (for example, a floating metal antenna) disposed on the rear cover. A wavelength mode in which the slot antenna generates the resonance 12 is not limited, and the resonance 12 may alternatively be generated in a three-half-wavelength mode, a five-half-wavelength mode, or the like of the slot antenna.

The coupling antenna apparatus implemented in the fourth manner may alternatively generate a resonance of another frequency band, not limited to the Wi-Fi frequency band such as the 2.4 GHz frequency band or the 5 GHz frequency band. This may be specifically set by adjusting a size or a shape of each antenna radiator (for example, the slot antenna or the floating metal antenna) in the antenna structure.

It may be understood that when a plurality of antenna elements (for example, a floating metal antenna) are disposed on the rear cover, the coupling antenna apparatus implemented in the fourth manner may generate more resonances. For example, the coupling antenna apparatus may generate three resonances in the 5 GHz frequency band.

In the coupling antenna apparatus implemented in the fourth manner, the feeding slot antenna and the antenna element disposed on the rear cover may be disposed in parallel and opposite to each other.

In a fifth manner, the feeding unit of the coupling antenna apparatus may be a feeding support antenna. The coupling unit of the coupling antenna apparatus may include an antenna element (for example, a floating metal antenna) disposed on the rear cover, and may further include a slot antenna formed by a slotted metal middle frame. The slot antenna may be longer than the floating metal antenna. The feeding support antenna may be coupled to one or more antenna elements (for example, a floating metal antenna) disposed on the rear cover and the slot antenna to generate resonances of a plurality of frequency bands. The resonances of the plurality of frequency bands may include a Wi-Fi frequency band (for example, a 2.4 GHz frequency band), and may further include a mobile communications frequency band. Optionally, the mobile communications frequency band may include one or more of the following: an LTE B1 frequency band, an LTE B3 frequency band, and an LTE B7 frequency band.

In an example implementation, a length of the slot antenna may be 43 millimeters, or a value near 43 millimeters (for example, a value within 40 millimeters to 45 millimeters). A width of the slot antenna (that is, a width of the slit) may be 1.1 millimeters, or a value near 1.1 millimeters (for example, 1.2 millimeters or 1.0 millimeter). A length of the support antenna may be 17 millimeters, or a value near 17 millimeters (for example, 16 millimeters or 18 millimeters). A width of the support antenna may be 5 millimeters, or a value near 5 millimeters (for example, 6 millimeters or 4 millimeters). A length of the floating metal antenna may be 32 millimeters, or a value near 32 millimeters (for example, 33 millimeters or 32 millimeters). A width of the floating metal antenna may be 6.5 millimeters, or a value near 6.5 millimeters (for example, 6 millimeters or 7 millimeters).

In an example implementation, a Z-directed distance between the support antenna and the floating metal antenna may be 0.15 millimeter to 0.25 millimeter. Outer surface contours of the support antenna and the floating metal antenna may have some radians, and there may be a plurality of different Z-directed distances between the support antenna and the floating metal antenna. A maximum Z-directed distance between the support antenna and the floating metal antenna may be 0.25 millimeter, and a minimum Z-directed distance between the support antenna and the floating metal antenna may be 0.15 millimeter. A Z-directed projection area of the floating metal antenna may not cover the support antenna, or may cover only a small part of the support antenna (for example, 20% of the support antenna).

In an example implementation, a Z-directed distance between the support antenna and the slot antenna may be 2 millimeters, or a value near 2 millimeters (for example, 1.8 millimeters or 2.2 millimeters). An X-directed distance between the support antenna and the slot antenna may be within 5 millimeters.

In the coupling antenna apparatus implemented in the fifth manner, the slot antenna may have both ends being closed and grounded. The antenna element (for example, a floating metal antenna) disposed on the rear cover may have both ends being open. The support antenna may have one end feeding power, and the other end being open. The coupling antenna apparatus implemented in the fifth manner may generate a resonance (which may be referred to as a resonance 16) near 1.8 GHz (LTE B3), may further generate a resonance (which may be referred to as a resonance 17) near 2.1 GHz (LTE B1), and may further generate a resonance (which may be referred to as a resonance 18) near 2.4 GHz (LTE B7). Specifically, the resonance 16 may be generated in a half-wavelength mode of the slot antenna, the resonance 17 may be generated in a half-wavelength mode of the floating metal antenna, and the resonance 18 may be generated in a quarter-wavelength mode of the support antenna.

A wavelength mode in which the slot antenna generates the resonance 16 is not limited, and the resonance 16 may alternatively be generated in a three-half-wavelength mode, a five-half-wavelength mode, or the like of the slot antenna. A wavelength mode in which the antenna element (for example, a floating metal antenna) disposed on the rear cover generates the resonance 17 is not limited, and the resonance 17 may alternatively be generated in a one-time wavelength mode, a three-half-wavelength mode, a five-half-wavelength mode, or the like of the antenna element (for example, a floating metal antenna) disposed on the rear cover. A wavelength mode in which the support antenna generates the resonance 18 is not limited, and the resonance 18 may alternatively be generated in a three-quarter-wavelength mode, a five-quarter-wavelength mode, or the like of the support antenna.

In some example embodiments, the coupling antenna apparatus implemented in the fifth manner may alternatively not include the slot antenna. In this case, the coupling antenna apparatus implemented in the fifth manner may be a coupling antenna apparatus formed by coupling the feeding support antenna to the floating metal antenna (that is, the slot antenna 21 is not included). The coupling antenna apparatus may also generate the resonances 16, 17, and 18. In this case, the floating metal antenna may be designed to be longer. In a possible implementation, a length of the floating metal antenna may be 39 millimeters, or a value near 39 millimeters (for example, 38 millimeters or 40 millimeters). In this way, the resonance 16 may be generated in a half-wavelength mode of the floating metal antenna, and the resonance 17 may be generated in a one-time wavelength mode of the floating metal antenna. The resonance 18 may be generated in a quarter-wavelength mode of the support antenna.

It can be learned that the coupling antenna apparatus implemented in the fifth manner may generate a plurality of resonances, and cover a Wi-Fi frequency band (for example, a 2.4 GHz frequency band) and frequency bands such as LTE B3, LTE B1, and LTE B7. The coupling antenna apparatus may alternatively generate a resonance of another frequency band, not limited to the Wi-Fi frequency band (for example, the 2.4 GHz frequency band) and the frequency bands such as LTE B3, LTE B1, and LTE B7. This may be specifically set by adjusting a size or a shape of each antenna radiator (for example, the floating metal antenna, the support antenna, or the slot antenna) in the antenna structure.

With reference to the first aspect, in some embodiments, in a coupling antenna structure formed by coupling the feeding antenna to two or more antenna elements (for example, a floating metal antenna) disposed on the rear cover, different coupling gaps may be separately formed between the two or more antenna elements (for example, a floating metal antenna) and the feeding antenna (for example, a feeding support antenna).

With reference to the first aspect, in some embodiments, the feeding unit (for example, a feeding support antenna or a feeding slot antenna) in the coupling antenna apparatus may have a plurality of antenna stubs. The antenna stubs of the feeding support antenna may be represented as a plurality of radiation arms, and the antenna stubs of the feeding slot antenna may be represented as a plurality of radiation slots. The plurality of antenna stubs may further increase a quantity of resonances generated by the coupling antenna structure, and may further increase frequency bands covered by the antenna.

With reference to the first aspect, in some embodiments, the antenna element (for example, a floating metal antenna) disposed on the rear cover in the coupling antenna apparatus may have a plurality of antenna stubs. The plurality of antenna stubs may further increase a quantity of resonances generated by the coupling antenna apparatus, and may further increase frequency bands covered by the antenna.

With reference to the first aspect, in some embodiments, the antenna element (for example, a floating metal antenna) disposed on the rear cover in the coupling antenna apparatus may be divided into a plurality of parts, and the plurality of parts may be connected by using a distribution parameter or a lumped parameter inductor, to reduce a size of the antenna element (for example, a floating metal antenna).

With reference to the first aspect, in some embodiments, an end of the antenna element (for example, a floating metal antenna) disposed on the rear cover may have a capacitor, so that a size of the antenna element (for example, a floating metal antenna) can be reduced.

With reference to the first aspect, in some embodiments, a filter, such as a band-pass filter or a high-frequency filter, may be disposed inside the antenna element (for example, a floating metal antenna) disposed on the rear cover, and may filter a signal radiated by the antenna element (for example, a floating metal antenna), to implement a plurality of frequency bands.

According to a second aspect, this application provides an electronic device. The electronic device may include a printed circuit board PCB, a metal middle frame, a rear cover, and the coupling antenna apparatus described in the first aspect.

BRIEF DESCRIPTION OF DRAWINGS

To describe technical solutions in embodiments of this application more clearly, the following describes the accompanying drawings required for the embodiments in this application.

DESCRIPTION OF EMBODIMENTS

The following describes example embodiments of the present invention with reference to the accompanying drawings.

The technical solutions provided in this application are applicable to an electronic device that uses one or more of the following MIMO communications technologies: long term evolution (LTE) communications technology, Wi-Fi communications technology, 5G communications technology, SUB-6G communications technology, another future MIMO communications technology, and the like. In this application, the electronic device may be an electronic device such as a mobile phone, a tablet computer, or a personal digital assistant (PDA).

Figure 1:
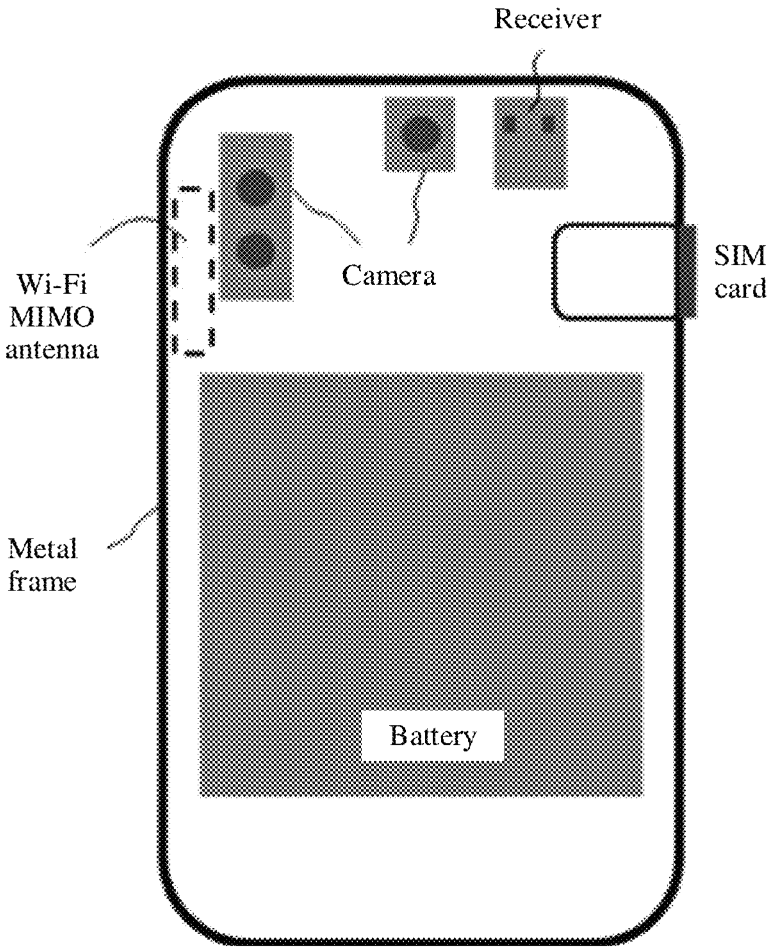
FIG. 1 is a schematic diagram of a design position of a conventional antenna.
Figure 2:
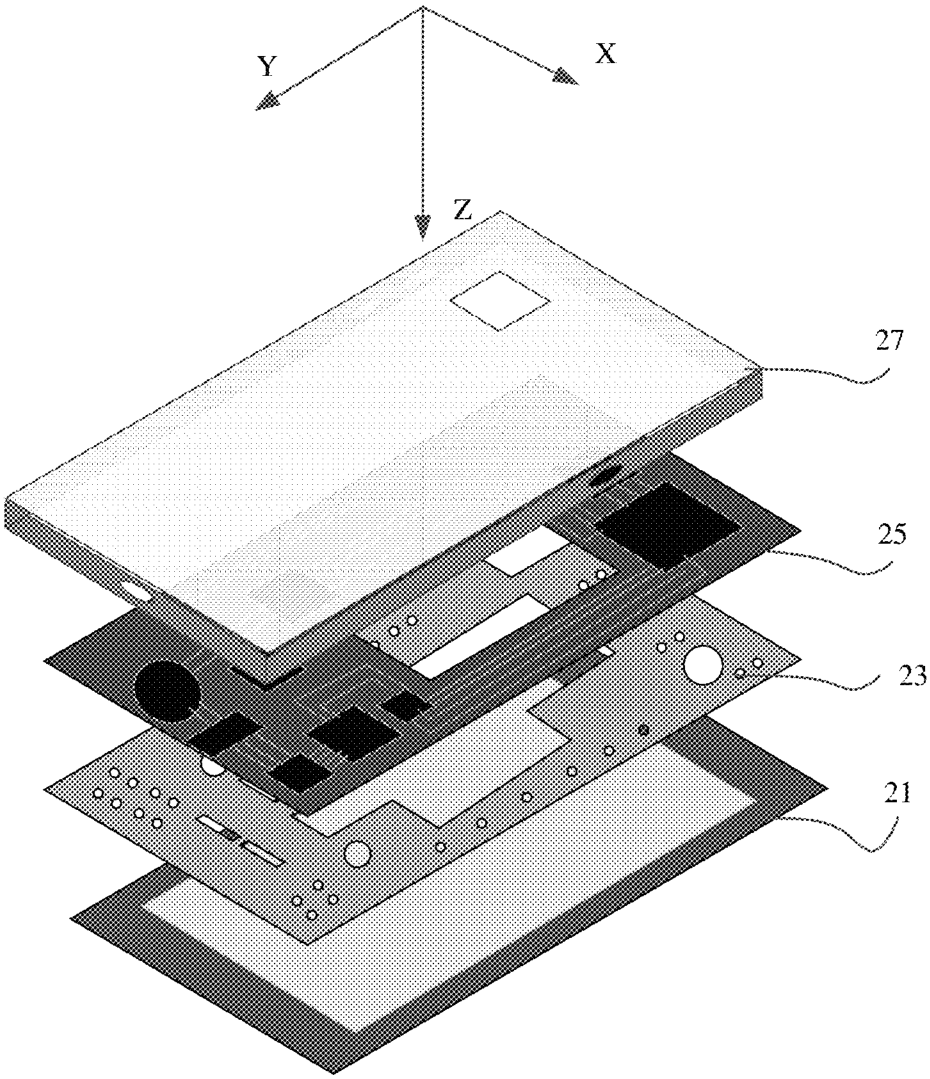
FIG. 2 is a schematic structural diagram of an electronic device according to an embodiment of this application.

FIG. 2 shows an example of an internal environment of an electronic device on which an antenna design solution provided in this application is based. As shown in FIG. 2, the electronic device may include a display screen 21, a metal middle frame 23, a printed circuit board (PCB) 25, and a rear cover 27. The display screen 21, the metal middle frame 23, the PCB 25, and the rear cover 27 may be separately disposed at different layers. These layers may be parallel to each other. A plane on which each layer is located may be referred to as an X-Y plane, and a direction perpendicular to the X-Y plane may be referred to as a Z direction. In other words, the display screen 21, the metal middle frame 23, the PCB 25, and the rear cover 27 may be distributed in a layered manner in the Z direction. The PCB 25 is located between the rear cover 27 and the metal middle frame 23. The rear cover 27 may be made of an insulating material, for example, may be made of glass, ceramic, or plastic.

An antenna support (for fastening an antenna) may be disposed on the PCB 25. The antenna support may be made of an insulating material, for example, a PC/ABS material. To meet an example clearance requirement of the antenna fastened on the antenna support, a Z-directed height from the antenna support to the PCB 25 may be 1.5 millimeters, a thickness of the antenna support may be 1 millimeter, and a Z-directed height from the inner surface of the rear cover 27 to the antenna support may be 0.3 millimeter. The 1.5 millimeters, 1 millimeter, and 0.3 millimeter mentioned herein are merely examples. Relative positions of the antenna support and surrounding components may be different, provided that the clearance requirement of the antenna on the antenna support is met.

A slot antenna may be formed by slitting on the metal middle frame 23 (for example, a side edge of the metal middle frame 23). The slot antenna may be filled with an insulating material, for example, a PC/ABS material (e.g., having a dielectric constant of 3.6, and a dielectric loss angle of 0.01). To meet a clearance requirement of the slot antenna of the metal middle frame 23, a Z-directed height from the display screen 21 to the metal middle frame 23 may be 0.3 millimeters. A clearance width of the slot antenna in a Z-directed projection area may be 0.6 millimeters. The 0.3 millimeters and the 0.6 millimeters mentioned herein are merely examples. Relative positions of the slot antenna and surrounding components may be different in example embodiments, provided that the clearance requirement of the slot antenna is met.

One or more floating metal antennas may be disposed on the rear cover 27. The floating metal antenna may be disposed on an inner surface of the rear cover 27, or may be disposed on an outer surface of the rear cover 27, or may be embedded in the rear cover 27. For example, the floating metal antenna may be a metal strip pasted on the inner surface of the rear cover 27, or may be printed on the inner surface of the rear cover 27 by using conductive silver paste. The floating metal antenna and a feeding antenna inside the electronic device may form a coupling antenna structure. The feeding antenna may be an antenna fastened on an antenna support (which may be referred to as a support antenna). The support antenna may be in different types of antenna forms, such as an IFA antenna, a monopole antenna, or a loop antenna. The feeding antenna may alternatively be a slot antenna formed by slitting on the metal middle frame. The antenna apparatus formed by the coupling antenna structure may generate excitation of a plurality of resonance modes, so that antenna bandwidth and radiation characteristics can be improved.

The following embodiment describes in detail a coupling antenna structure formed by using a feeding antenna and a floating metal antenna.

Embodiment 1

In Embodiment 1, the support antenna may be a feeding unit, and the slot antenna and the floating metal antenna may be coupling units. In other words, the feeding support antenna may be coupled to both the floating metal antenna and the slot antenna.

Figure 3A:
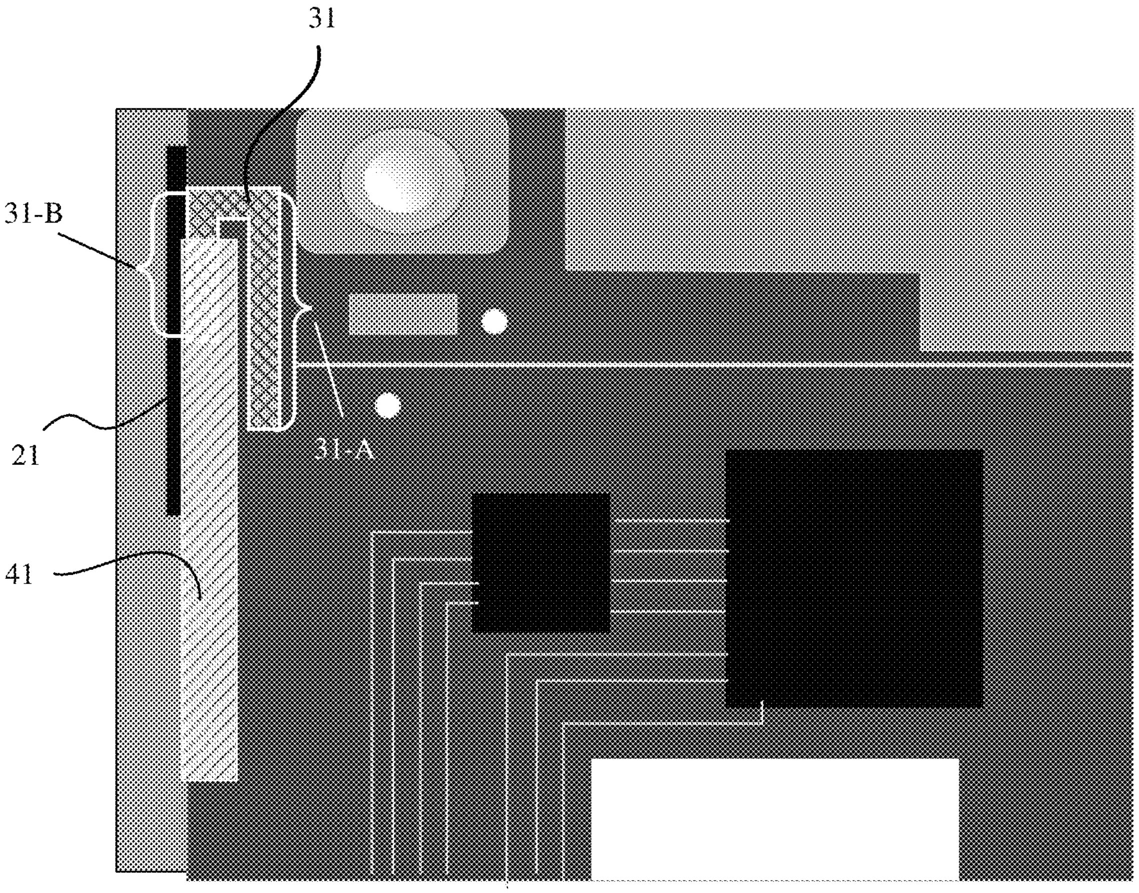
FIG. 3A to FIG. 3F are schematic diagrams of an antenna apparatus according to an embodiment of this application.
Figure 3B:
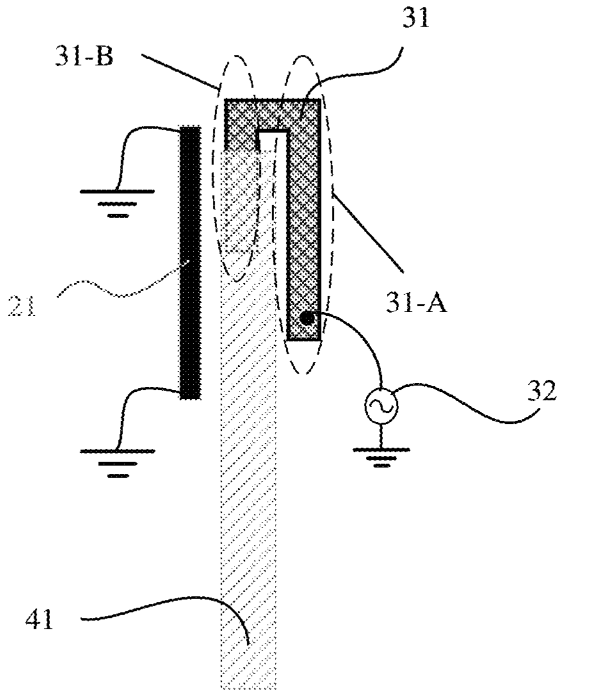

FIG. 3A and FIG. 3B show examples of a coupling antenna structure according to Embodiment 1. FIG. 3A is a schematic diagram of a simulation model, and FIG. 3B is a simplified structural diagram. As shown in FIG. 3A and FIG. 3B, the coupling antenna structure may include a support antenna 31, a slot antenna 21, and a floating metal antenna 41.

The support antenna 31 may be fastened on an antenna support (not shown). The support antenna 31 may have a feeding point. The support antenna 31 may have one end feeding power 32, and the other end being open. The slot antenna 21 may be formed by slitting a side edge of the metal middle frame. Not limited to the side edge, the slot antenna 21 may alternatively be formed by slitting at another position of the metal middle frame. The slot antenna 21 may have both ends being closed and grounded. The floating metal antenna 41 may be disposed on an inner surface of a rear cover. The floating metal antenna 41 may have both ends being open. The slot antenna 21 and the floating metal antenna 41 may not feed power, may be used as coupling units, and are coupled to the feeding support antenna 31.

The feeding support antenna 31 and the floating metal antenna 41 may be disposed in parallel and opposite to each other. Herein, the parallel and opposite disposition may mean that one or more radiation arms of the support antenna 31 may be disposed in parallel and opposite to the floating metal antenna 41. For example, as shown in FIG. 3A and FIG. 3B, a radiation arm 31-A and a radiation arm 31-B of the support antenna 31 may be disposed in parallel and opposite to the floating metal antenna 41. In some example implementations, the floating metal antenna 41 may have a plurality of radiation arms, and one or more radiation arms may be respectively disposed in parallel and opposite to the one or more radiation arms of the support antenna 31.

It should be understood that the feeding support antenna 31 and the floating metal antenna 41 may not necessarily be disposed in parallel and opposite to each other. When the feeding support antenna 31 and the floating metal antenna 41 are not disposed in parallel and opposite to each other, the feeding support antenna 31 may alternatively be coupled to the floating metal antenna 41, but a coupling effect is weaker than a coupling effect obtained when the feeding support antenna 31 and the floating metal antenna 41 are disposed in parallel and opposite to each other.

The feeding support antenna 31 and the slot antenna 21 may be disposed in parallel and opposite to each other. Herein, the parallel and opposite disposition may mean that one or more radiation arms of the support antenna 31 may be disposed in parallel and opposite to the slot antenna 21. For example, as shown in FIG. 3A and FIG. 3B, the radiation arm 31-A and the radiation arm 31-B of the support antenna 31 may be disposed in parallel and opposite to the slot antenna 21. In some example implementations, the slot antenna 21 may have a plurality of radiating slots, and one or more radiating slots may be respectively disposed in parallel and opposite to the one or more radiation arms of the support antenna 31.

It should be understood that the feeding support antenna 31 and the slot antenna 21 may not necessarily be disposed in parallel and opposite to each other. When the feeding support antenna 31 and the slot antenna 21 are not disposed in parallel and opposite to each other, the feeding support antenna 31 may alternatively be coupled to the slot antenna 21, but a coupling effect is weaker than a coupling effect obtained when the feeding support antenna 31 and the slot antenna 21 are disposed in parallel and opposite to each other.

Figure 3C:
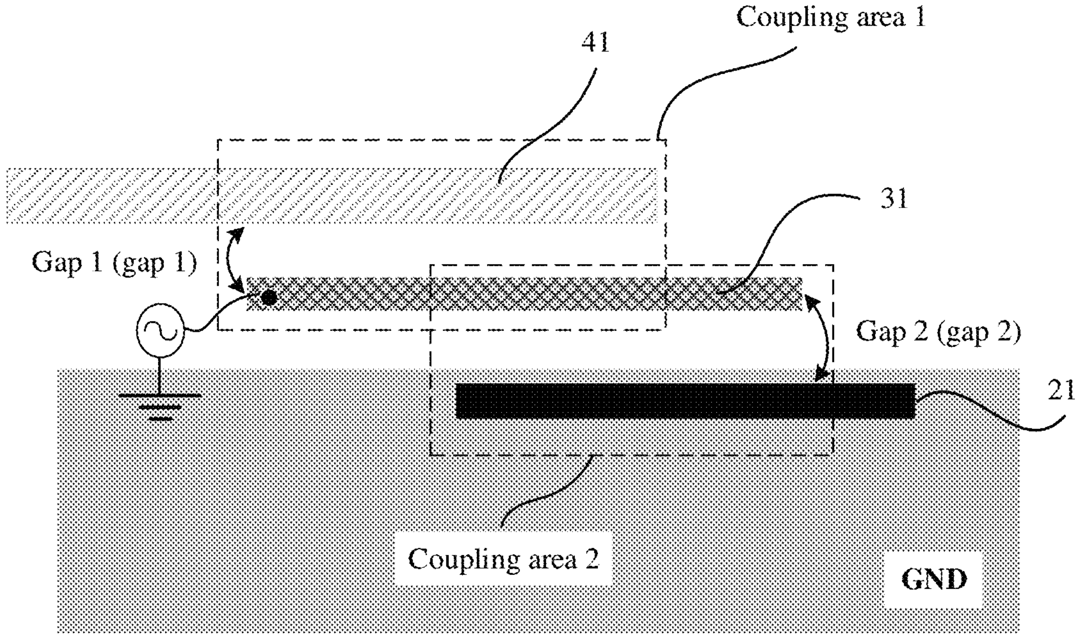

FIG. 3C shows an example of coupling gaps between the feeding support antenna 31 and the floating metal antenna 41 and between the feeding support antenna 31 and the slot antenna 21. As shown in FIG. 3C, a coupling gap 1 (gap 1) may exist between the feeding support antenna 31 and the floating metal antenna 41, and a coupling area 1 may be formed between the feeding support antenna 31 and the floating metal antenna 41. A coupling gap 2 (gap 2) may exist between the feeding support antenna 31 and the slot antenna 21, and a coupling area 2 may be formed between the feeding support antenna 31 and the slot antenna 21. It should be understood that a smaller coupling gap indicates a stronger coupling effect, and a larger coupling area indicates a stronger coupling effect. Specific values of the coupling gap 1, the coupling gap 2, the coupling area 1, and the coupling area 2 are not limited in this application, provided that the support antenna 31 can be coupled to the floating metal antenna 41 and the slot antenna 21.

FIG. 3C shows only a coupling gap between antennas. The coupling gap between antennas (for example, the coupling gap between the support antenna 31 and the floating metal antenna 41) may have only one value, that is, coupling gaps are equal. The coupling gap between antennas (for example, the coupling gap between the support antenna 31 and the floating metal antenna 41) may alternatively have a plurality of values, because an outer surface of an antenna may be bent, and a coupling gap at a position is relatively large while a coupling gap at a position is relatively small. A position with a minimum coupling gap may be a position at which antennas are closest to each other, and a position with a maximum coupling gap may be a position at which antennas are farthest from each other.

To meet a clearance requirement of each antenna radiator in the foregoing coupling antenna structure, an example position relationship between each antenna radiator and a surrounding metal component (such as a display screen or a PCB) may be as follows:

A slot width of the slot antenna 21 may be 1.2 millimeters, and a width of 0.6 millimeters of the slot antenna 21 in a Z-directed projection area may overlap the display screen. In this way, an antenna clearance width of the slot antenna 21 in the Z-directed projection area may be 0.6 millimeter, and this can meet a clearance requirement of the slot antenna 21. Not limited to the 0.6 millimeter mentioned herein, the antenna clearance width of the slot antenna 21 in the Z-directed projection area may alternatively be another value, provided that the clearance requirement is met.

A Z-directed distance between the floating metal antenna 41 and the support antenna 31 may be 0.3 millimeter, and a Z-directed distance between the floating metal antenna 41 and the PCB may be 1.8 millimeters. A Z-directed distance between the antenna support (not shown) for fastening the support antenna 31 and the PCB may be 1.5 millimeters. In this way, clearance requirements of the support antenna 31 and the floating metal antenna 41 can be met. Not limited to the position relationship described herein by 0.3 millimeter, 1.8 millimeters, and 1.5 millimeters, the position relationship between the floating metal antenna 41, the support antenna 31, and the surrounding metal component (such as the PCB) may be different, provided that the clearance requirements of the floating metal antenna 41 and the support antenna 31 are met.

For the display screen, the PCB, the antenna support, and the rear cover mentioned in the foregoing content, refer to related descriptions in FIG. 2. In some example implementations, the floating metal antenna 41 may alternatively be disposed on an outer surface of the rear cover, or may be embedded in the rear cover.

The following describes resonance modes that can be generated by the coupling antenna structure in the examples shown in FIG. 3A and FIG. 3B.

Figure 3D:
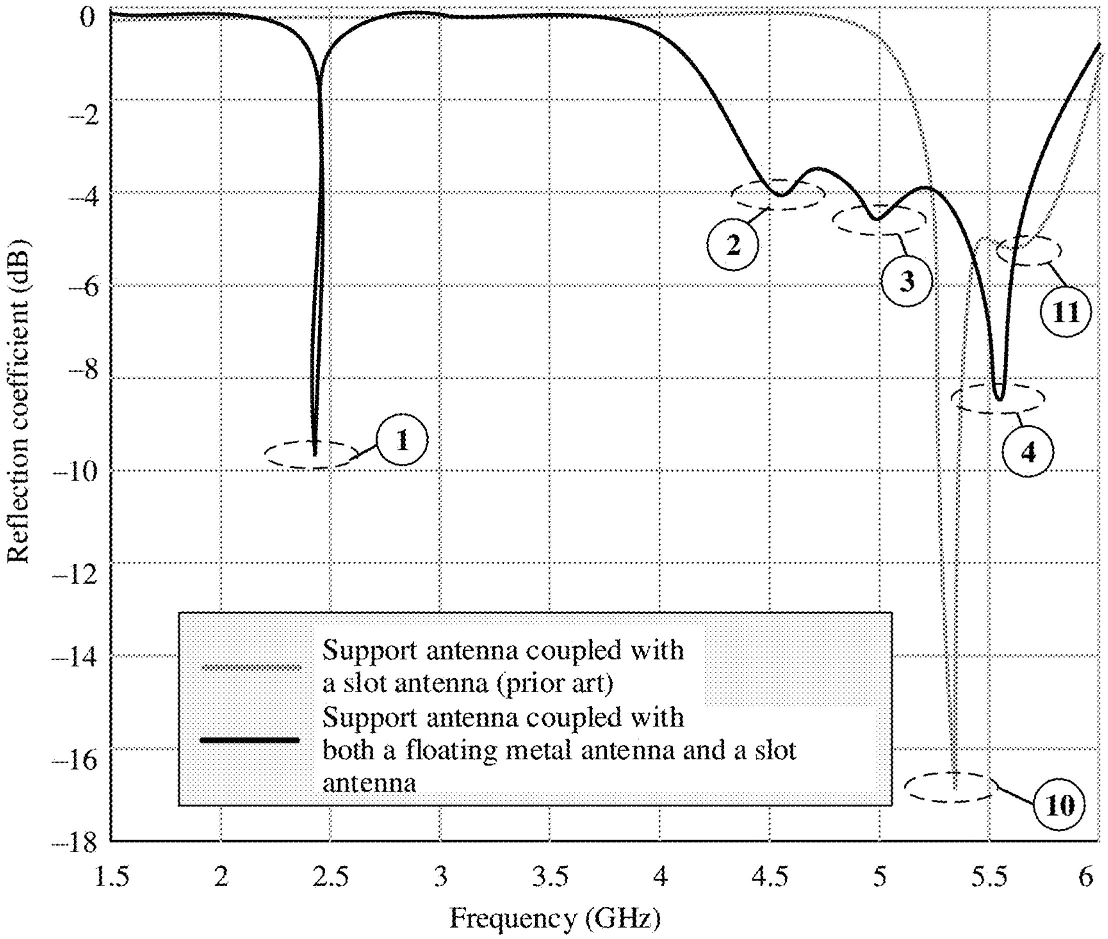

Referring to FIGS. 3D, 1, 2, 3, and 4 in FIG. 3D represent different resonances. The coupling antenna structure may generate a resonance 1 near 2.4 GHz, and may further generate three resonances 2, 3, and 4 near 5 GHz. Details are as follows:

The resonance 1 may be generated in a half-wavelength mode of the floating metal antenna 41. In the three resonances 2, 3, and 4 near 5 GHz, a lowest resonance (that is, the resonance 2) may be generated in a one-time wavelength mode of the floating metal antenna 41, an intermediate resonance (that is, the resonance 3) may be generated by the support antenna (for example, in a quarter-wavelength mode), and a highest resonance (that is, the resonance 4) may be generated in a half-wavelength mode of the slot antenna 21.

Figure 3E:
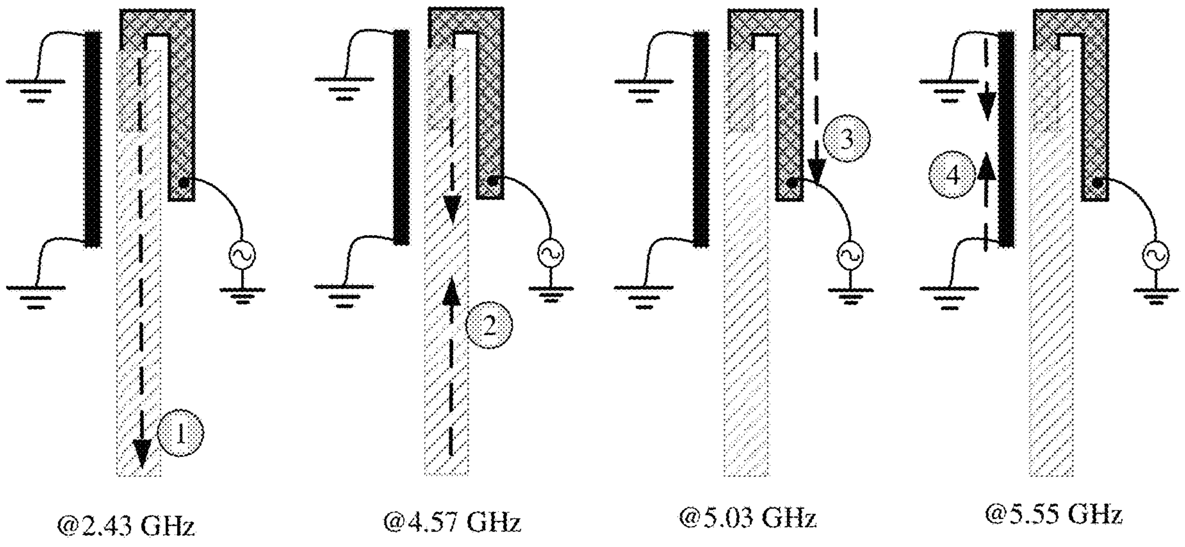
Figure 3F:
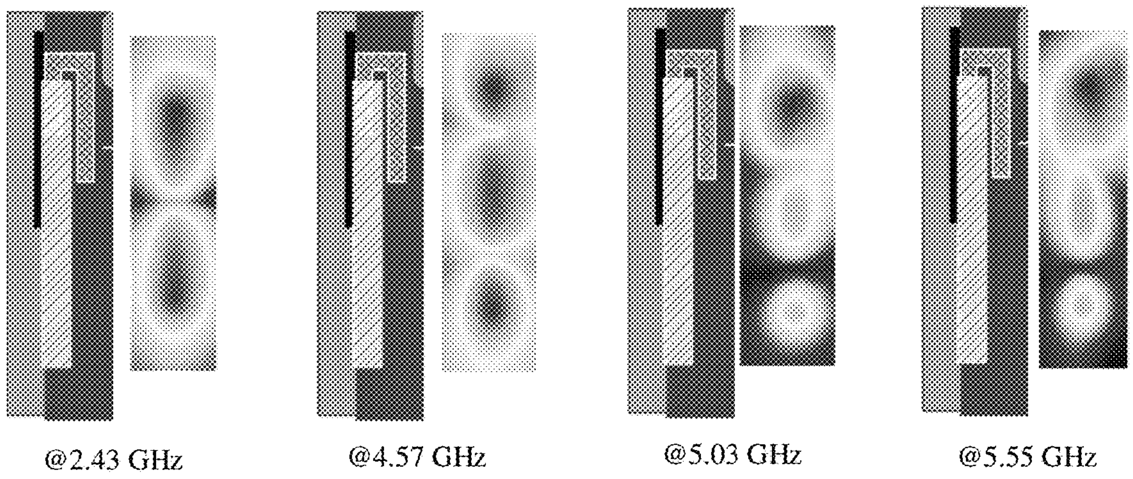

FIG. 3E shows an example of current distribution of the resonances 1, 2, 3, and 4. FIG. 3F shows an example of electric field distribution of the resonances 1, 2, 3, and 4. It can be learned from the current distribution and the electric field distribution of the resonance 1 that, two ends (both are open ends) of the floating metal antenna 41 are strong electric field points, and a signal of the resonance 1 may be radiated in the half-wavelength mode of the floating metal antenna 41. It can be learned from the current distribution and the electric field distribution of the resonance 2 that, the two ends of the floating metal antenna 41 and a middle position are strong electric field points, and a signal of the resonance 2 may be radiated in the one-time wavelength mode of the floating metal antenna 41. It can be learned from the current distribution and the electric field distribution of the resonance 3 that, one end (a feeding end) of the support antenna 31 is a strong current point, the other end (an open end) of the support antenna 31 is a strong electric field point, and a signal of the resonance 3 may be radiated in the quarter-wavelength mode of the support antenna 31. It can be learned from the current distribution and the electric field distribution of the resonance 4 that, two ends (ground ends) of the slot antenna 21 are strong current points, a middle position is a strong electric field point, and a signal of the resonance 4 may be radiated in the half-wavelength mode of the slot antenna.

A wavelength mode in which the floating metal antenna 41 generates the resonance 1 is not limited, and the resonance 1 may alternatively be generated in the one-time wavelength mode, a three-half-wavelength mode, or the like of the floating metal antenna 41. A wavelength mode in which the floating metal antenna 41 generates the resonance 2 is not limited, and the resonance 2 may alternatively be generated in a three-half-wavelength mode, a five-half-wavelength mode, or the like of the floating metal antenna 41. A wavelength mode in which the support antenna 31 generates the resonance 3 is not limited, and the resonance 3 may alternatively be generated in a three-quarter-wavelength mode, a five-quarter-wavelength mode, or the like of the support antenna 31. A wavelength mode in which the slot antenna 21 generates the resonance 4 is not limited, and the resonance 4 may alternatively be generated in a three-half-wavelength mode, a five-half-wavelength mode, or the like of the slot antenna 21.

In some example implementations, the slot antenna 21 may have one end being closed and grounded, and the other end being open. In this case, the slot antenna 21 may generate the resonance 4 in a quarter-wavelength mode, a three-quarter-wavelength mode, a five-quarter-wavelength mode, or the like.

In other words, the feeding support antenna 31 may be coupled to both the floating metal antenna 41 and the slot antenna 21, to generate resonances of a plurality of Wi-Fi frequency bands and cover the plurality of Wi-Fi frequency bands.

The coupling antenna structure in the examples shown in FIG. 3A and FIG. 3B may further generate a resonance of another frequency band, not limited to the 2.4 GHz frequency band and the 5 GHz frequency band. This may be specifically set by adjusting a size or a shape of each antenna radiator (for example, the floating metal antenna 41, the support antenna 31, or the slot antenna 21) in the antenna structure.

In this application, a frequency band is a frequency range. For example, the 2.4 GHz frequency band may be a frequency range from 2.4 GHz to 2.4835 GH, that is, a frequency range near 2.4 GHz. For another example, the 5 GHz frequency band may be a frequency range of 5.150 GHz to 5.350 GHz or of 5.725 GHz to 5.850 GHz, that is, a frequency range near 5 GHz.

FIG. 3D further shows a resonance mode generated by a conventional coupling antenna structure, for example, a coupling antenna structure (referring to FIG. 3G) in which the support antenna 31 is coupled to the slot antenna 21. Because design space of the support antenna 31 is limited, and a design size of the support antenna is very small, in this conventional coupling antenna structure, only two resonances 10 and 11 can be generated near 5 GHz, and no resonance can be generated near 2.4 GHz.

Figure 3G:
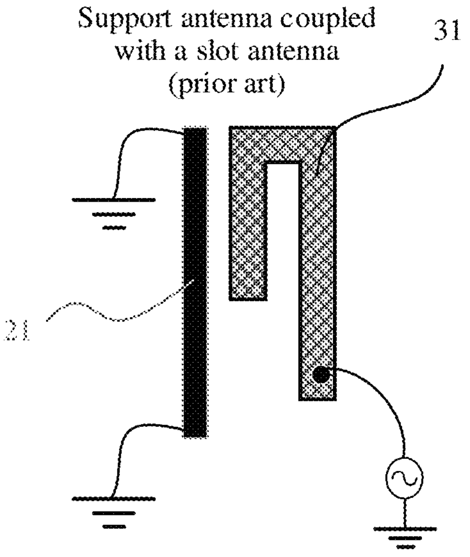
FIG. 3G is a schematic diagram of a conventional coupling antenna structure.

It can be learned that, compared with the conventional coupling antenna structure shown in FIG. 3G, the coupling antenna structure in the examples shown in FIG. 3A and FIG. 3B includes the floating metal antenna disposed on the rear cover, a size of the floating metal antenna may be designed to be relatively large, and a coupling antenna structure formed by the floating metal antenna and the feeding support antenna can excite a resonance mode of a lower frequency band, generate more resonances, and implement coverage of more frequency bands. In addition, a size of the support antenna included in the coupling antenna structure in the examples shown in FIG. 3A and FIG. 3B may be designed to be very small, and impact of a surrounding component is reduced. This can be implemented in relatively small design space.

Embodiment 2

Figure 4A:
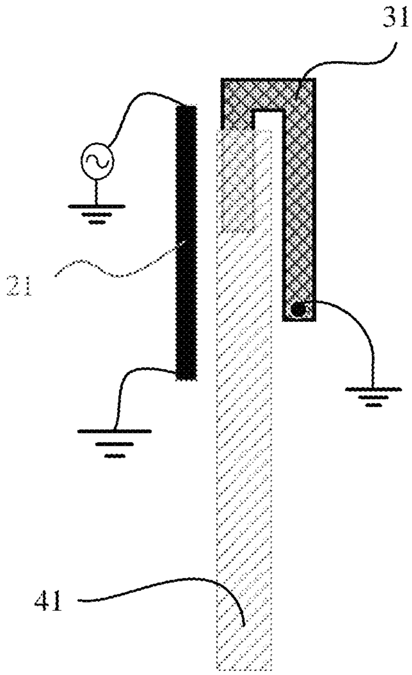
FIG. 4A and FIG. 4B are schematic diagrams of an antenna apparatus according to an embodiment of this application.

For a schematic diagram of a simulation model of the coupling antenna structure according to Embodiment 2, refer to FIG. 3A. Different from Embodiment 1, as shown in FIG. 4A, the slot antenna 21 may have a feeding point. The slot antenna 21 may have one end feeding power, and the other end being closed and grounded. The support antenna 31 may have one end being closed and grounded, and the other end being open. The floating metal antenna may have both ends being open. The slot antenna 21 may be a feeding unit, and the support antenna 31 and the floating metal antenna 41 may be coupling units. In other words, the feeding slot antenna 21 may be coupled to both the floating metal antenna 41 and the support antenna 31.

The feeding slot antenna 21 and the floating metal antenna 41 may be disposed in parallel and opposite to each other. Herein, the parallel and opposite disposition may mean that one or more radiation slots of the slot antenna 21 may be disposed in parallel and opposite to the floating metal antenna 41. In some example implementations, the floating metal antenna 41 may have a plurality of radiation arms, and one or more radiation arms may be disposed in parallel and opposite to the one or more radiation slots of the slot antenna 21.

The feeding slot antenna 21 and the support antenna 31 may be disposed in parallel and opposite to each other. Herein, the parallel and opposite disposition may mean that one or more radiation slots of the slot antenna 21 may be disposed in parallel and opposite to the support antenna 31. In some example implementations, the support antenna 31 may have a plurality of radiation arms, and one or more radiation arms may be disposed in parallel and opposite to the one or more radiation slots of the slot antenna 21.

Figure 4B:
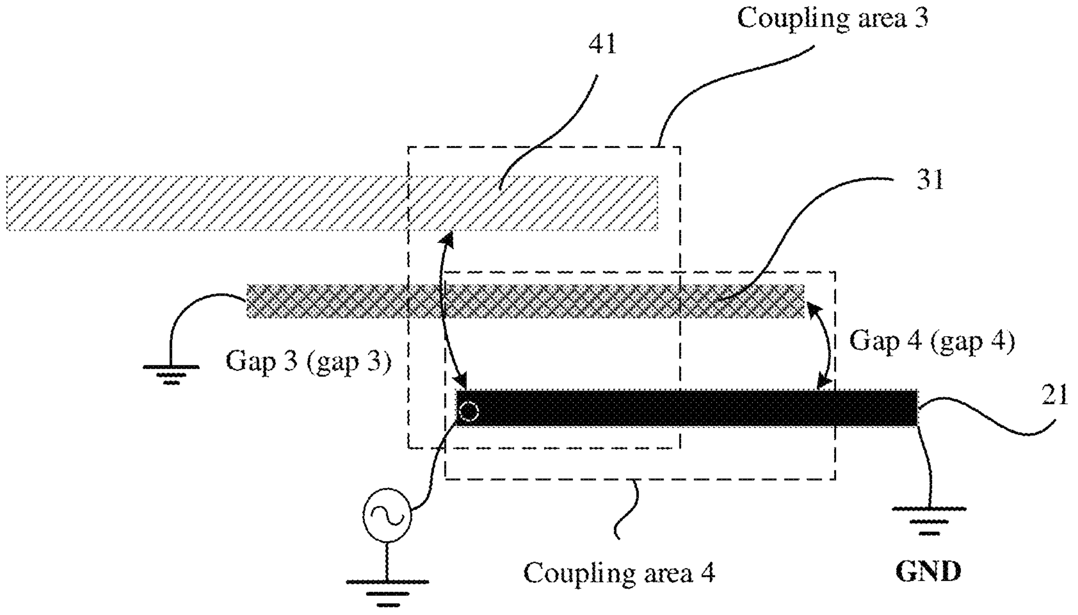

FIG. 4B shows an example of a coupling gap between antenna radiators included in the coupling antenna structure according to Embodiment 2. As shown in FIG. 4B, a coupling gap 3 (gap 3) may exist between the feeding slot antenna 21 and the floating metal antenna 41, and a coupling area 3 may be formed between the feeding slot antenna 21 and the floating metal antenna 41. A coupling gap 4 (gap 4) may exist between the feeding slot antenna 21 and the support antenna 31, and a coupling area 4 may be formed between the feeding slot antenna 21 and the support antenna 31. Specific values of the coupling gap 3, the coupling gap 4, the coupling area 3, and the coupling area 4 are not limited in this application, provided that the slot antenna 21 can be coupled to the floating metal antenna 41 and the support antenna 31.

To meet a clearance requirement of each antenna radiator in the coupling antenna structure, for a position relationship between each antenna radiator and a surrounding metal component, refer to related descriptions in Embodiment 1.

In the coupling antenna structure according to Embodiment 2, the feeding slot antenna 21 can be coupled to both the floating metal antenna 41 and the support antenna 31, generate resonances of a plurality of Wi-Fi frequency bands, and cover the plurality of Wi-Fi frequency bands. The coupling antenna structure according to Embodiment 2 can generate a resonance mode that is the same as that generated by the coupling antenna structure provided in Embodiment 1. For details, refer to related descriptions in Embodiment 1.

Embodiment 3

Different from Embodiment 1, a coupling antenna structure may have no slot antenna.

Figure 5A:
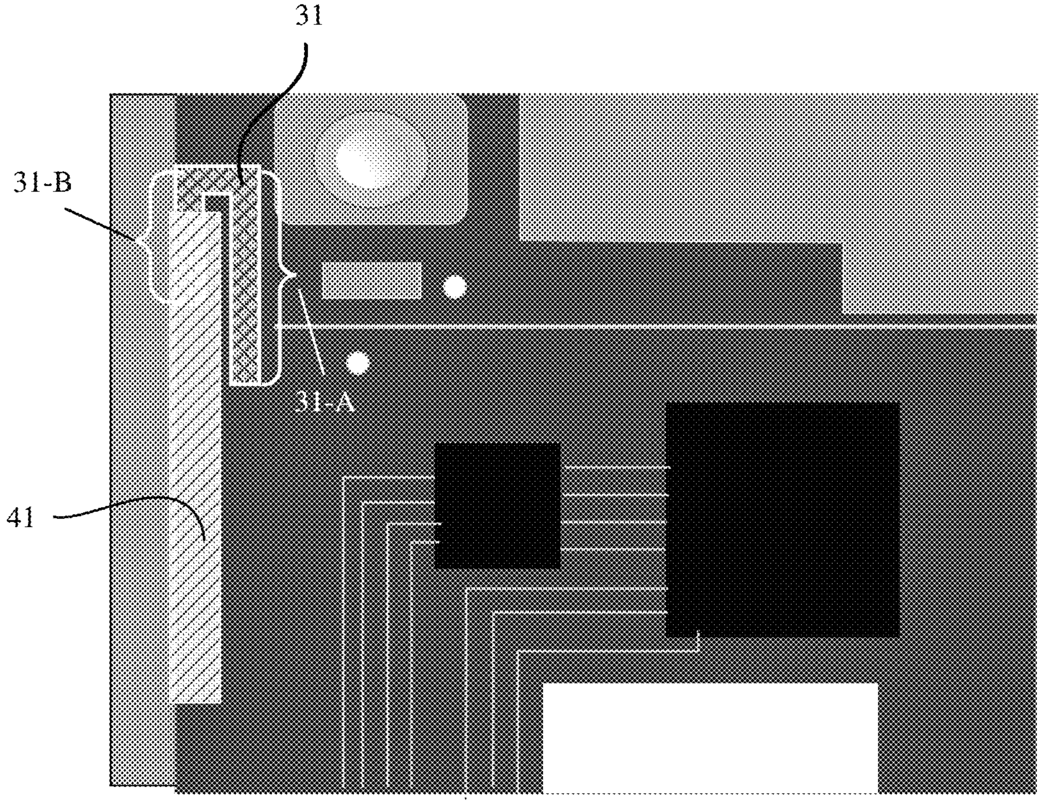
FIG. 5A to FIG. 5D are schematic diagrams of an antenna apparatus according to another embodiment of this application.
Figure 5B:
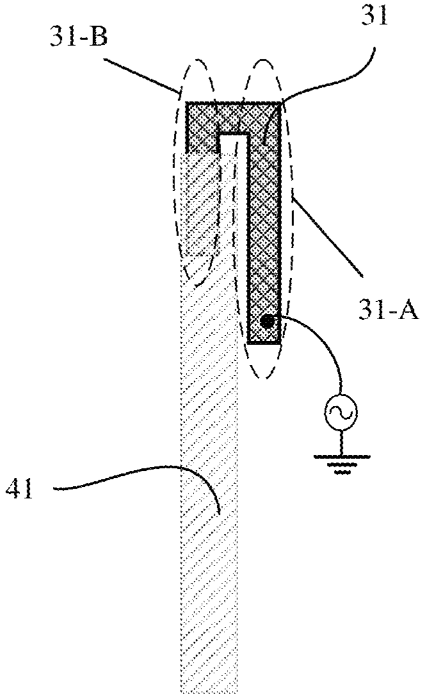

FIG. 5A and FIG. 5B show examples of the coupling antenna structure according to Embodiment 3. FIG. 5A is a schematic diagram of a simulation model, and FIG. 5B is a simplified structural diagram. As shown in FIG. 5A and FIG. 5B, the coupling antenna structure may include a support antenna 31 and a floating metal antenna 41. The support antenna 31 may have a feeding point. The support antenna 31 may have one end feeding power, and the other end being open. The floating metal antenna 41 may have both ends being open. The support antenna may be a feeding unit, and the floating metal antenna may be a coupling unit. In other words, the feeding support antenna may be coupled to the floating metal antenna.

Figure 5C:
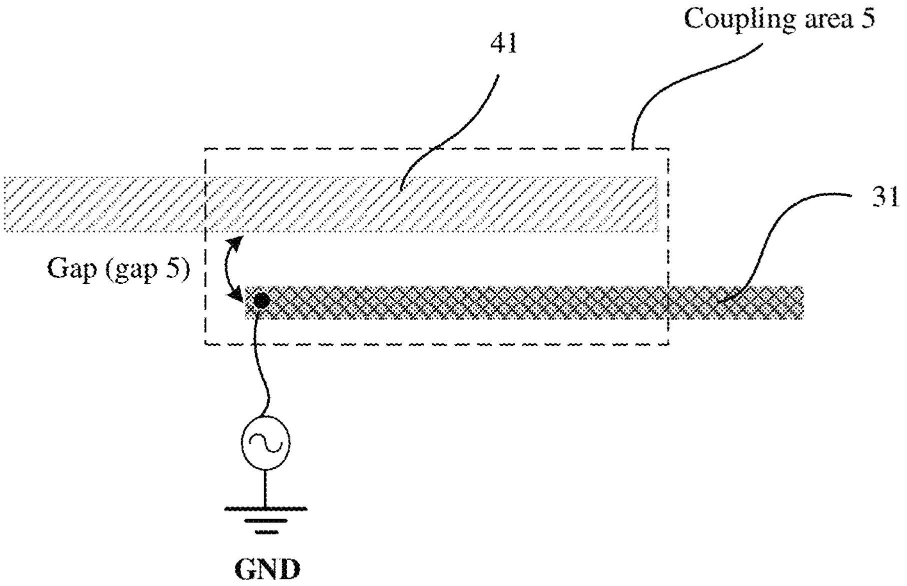

FIG. 5C shows an example of a coupling gap between the feeding support antenna 31 and the floating metal antenna 41. As shown in FIG. 5C, a coupling gap 5 (gap 5) may exist between the feeding support antenna 31 and the floating metal antenna 41, and a coupling area 5 may be formed between the feeding support antenna 31 and the floating metal antenna 41. The coupling gap 5 may be equal to the coupling gap 1 in Embodiment 1, and the coupling area 5 may be equal to the coupling area 1 in Embodiment 1. A value of the coupling gap 5 and a value of the coupling area 5 are not limited in this application, provided that the feeding support antenna 31 can be coupled to the floating metal antenna 41.

To meet clearance requirements of the support antenna 31 and the floating metal antenna 41 in the coupling antenna structure, for a position relationship between the support antenna 31, the floating metal antenna 41, and a surrounding metal component (such as a PCB), refer to related descriptions in Embodiment 1.

The following describes resonance modes that can be generated by the coupling antenna structure in the examples shown in FIG. 5A and FIG. 5B.

Figure 5D:
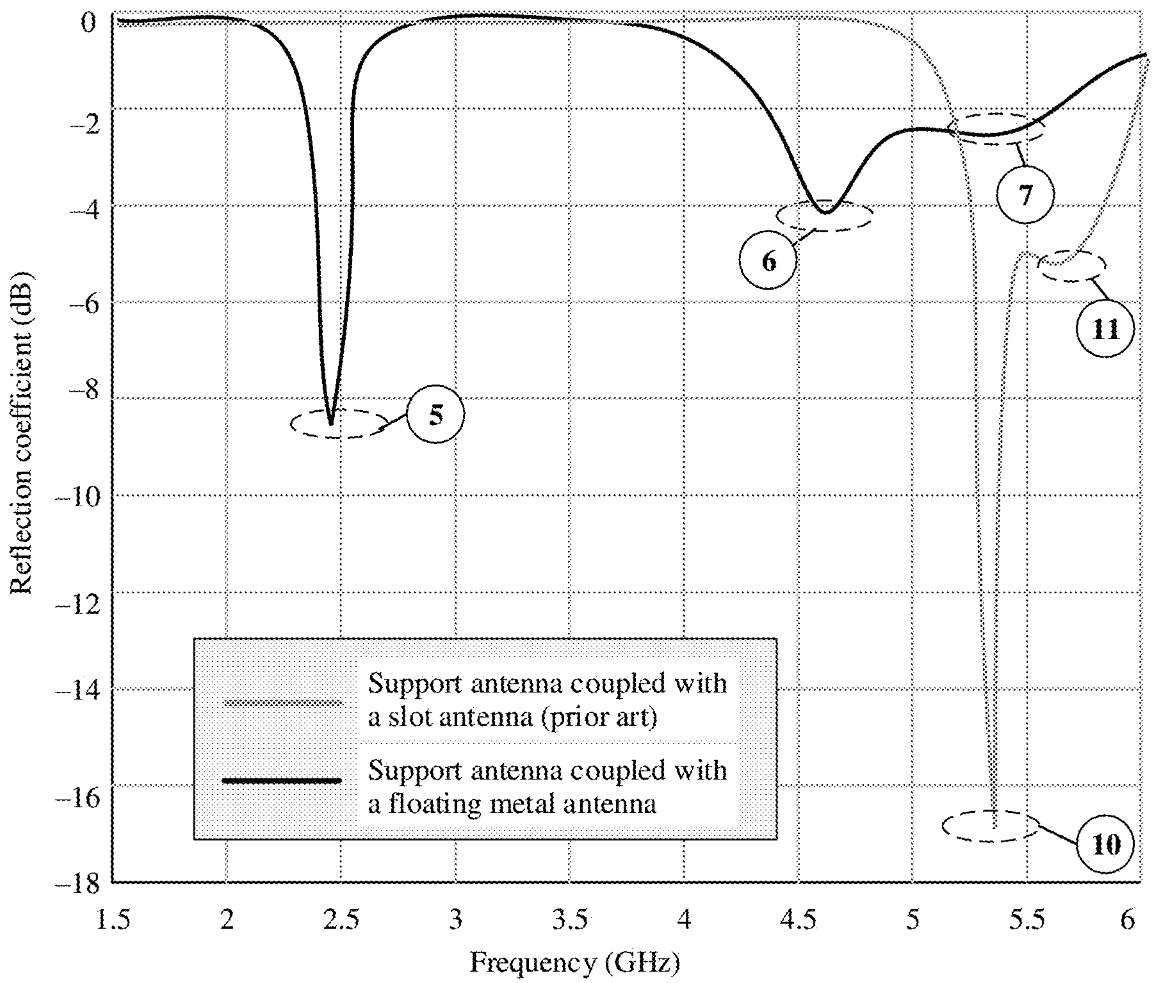

Referring to FIGS. 5D, 5, 6, and 7 in FIG. 5D represent different resonances. The coupling antenna structure may generate a resonance 5 near 2.4 GHz, and may further generate two resonances 6 and 7 near 5 GHz. Details are as follows:

The resonance 5 may be generated in a half-wavelength mode of the floating metal antenna 41. In the two resonances 6 and 7 near 5 GHz, a lower resonance (that is, the resonance 6) may be generated in a one-time wavelength mode of the floating metal antenna 41, and a higher resonance (that is, the resonance 7) may be generated by the support antenna (in a quarter-wavelength mode).

In other words, the feeding support antenna 31 may be coupled to the floating metal antenna 41, generate a plurality of resonances, and cover a plurality of frequency bands. Specifically, the feeding support antenna 31 may generate the resonance 7, and may be coupled to the floating metal antenna 41, to excite the floating metal antenna 41 to generate the resonance 5 and the resonance 6.

A wavelength mode in which the floating metal antenna 41 generates the resonance 5 is not limited, and the resonance 5 may alternatively be generated in a one-time wavelength mode, a three-half-wavelength mode, or the like of the floating metal antenna 41. A wavelength mode in which the floating metal antenna 41 generates the resonance 6 is not limited, and the resonance 6 may alternatively be generated in a three-half-wavelength mode, a five-half-wavelength mode, or the like of the floating metal antenna 41. A wavelength mode in which the support antenna 31 generates the resonance 7 is not limited, and the resonance 7 may alternatively be generated in a three-quarter-wavelength mode, a five-quarter-wavelength mode, or the like of the support antenna 31.

In other words, the feeding support antenna 31 may be coupled to the floating metal antenna 41, generate resonances of a plurality of Wi-Fi frequency bands, and cover the plurality of Wi-Fi frequency bands.

The coupling antenna structure in the examples shown in FIG. 5A and FIG. 5B may further generate a resonance of another frequency band, not limited to the 2.4 GHz frequency band and the 5 GHz frequency band. This may be specifically set by adjusting a size or a shape of each antenna radiator (for example, the floating metal antenna 41 and the support antenna 31) in the antenna structure.

FIG. 5D further shows a resonance mode generated by a conventional coupling antenna structure, for example, a coupling antenna structure (referring to FIG. 3G) in which the support antenna 31 is coupled to the slot antenna 21. Because design space of the support antenna 31 is limited, and a design size of the support antenna is very small, in this conventional coupling antenna structure, only two resonances 10 and 11 can be generated near 5 GHz, and no resonance can be generated near 2.4 GHz.

It can be learned that, compared with the conventional coupling antenna structure shown in FIG. 3G, the coupling antenna structure in the examples shown in FIG. 5A and FIG. 5B includes the floating metal antenna disposed on the rear cover, a size of the floating metal antenna may be designed to be relatively large, and a coupling antenna structure formed by the floating metal antenna and the feeding support antenna can excite a resonance mode of a lower frequency band, generate more resonances, and implement coverage of more frequency bands.

Embodiment 4

Different from Embodiment 2, a coupling antenna structure may have no support antenna.

Figure 6A:
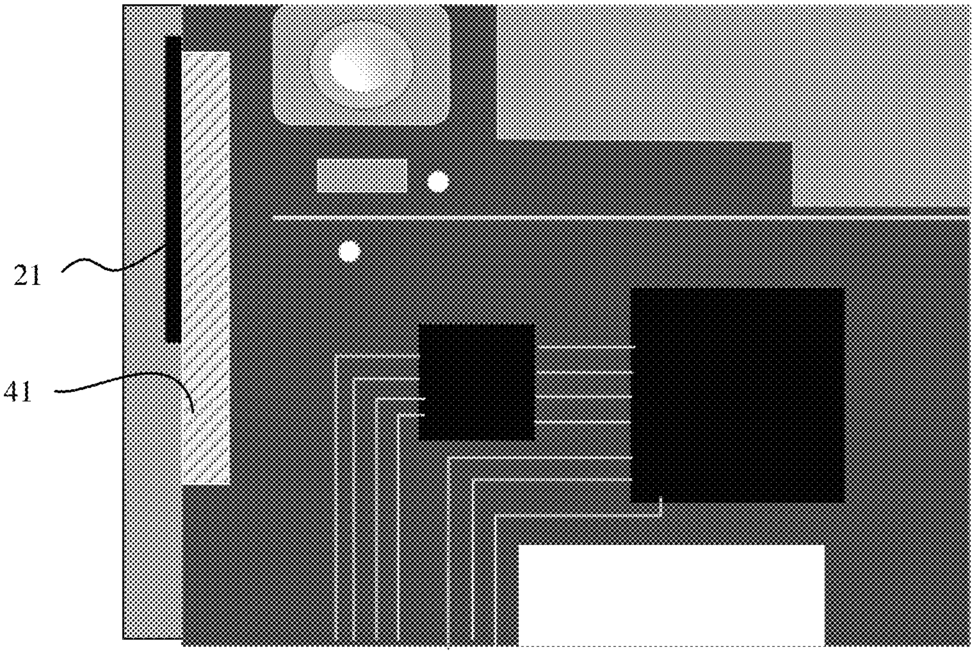
FIG. 6A to FIG. 6D are schematic diagrams of an antenna apparatus according to still another embodiment of this application.
Figure 6B:
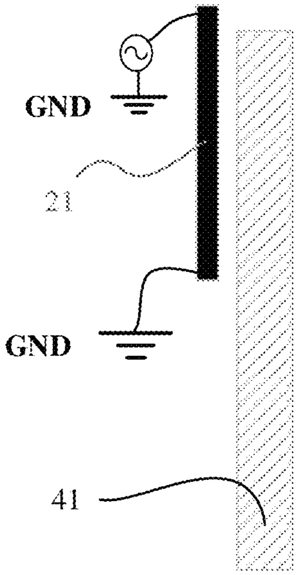

FIG. 6A and FIG. 6B show examples of the coupling antenna structure according to Embodiment 4. FIG. 6A is a schematic diagram of a simulation model, and FIG. 6B is a simplified structural diagram. As shown in FIG. 6A and FIG. 6B, the coupling antenna structure may include a slot antenna 21 and a floating metal antenna 41. The slot antenna 21 may have a feeding point. The slot antenna 21 may have one end feeding power, and the other end being closed and grounded. The floating metal antenna 41 may have both ends being open. The slot antenna 21 may be a feeding unit, and the floating metal antenna 41 may be a coupling unit. In other words, the feeding slot antenna 21 may be coupled to the floating metal antenna 41.

Figure 6C:
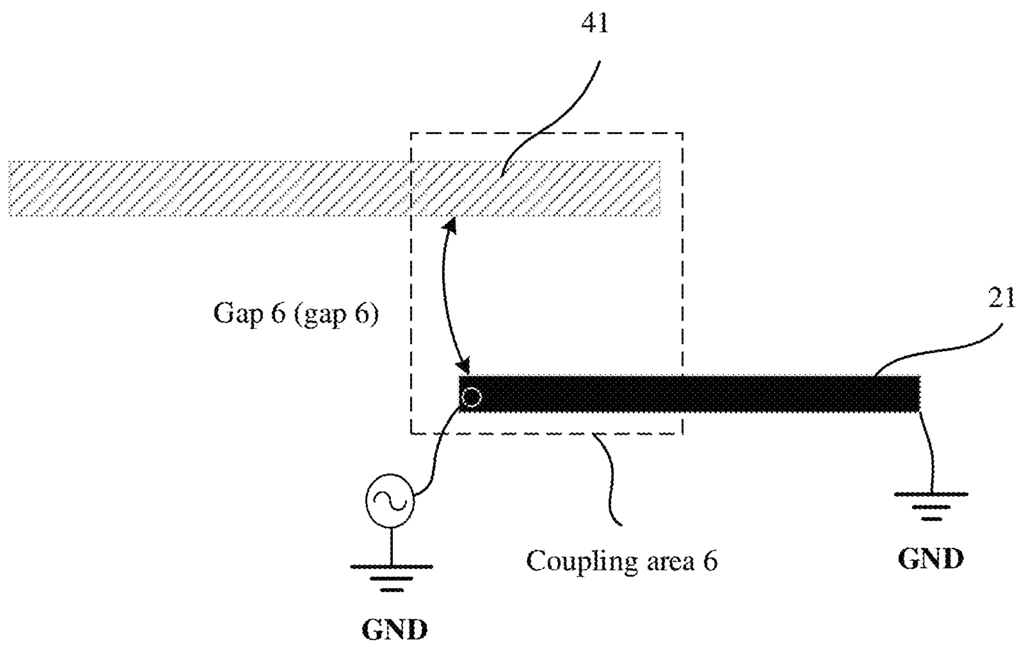

FIG. 6C shows an example of a coupling gap between the feeding slot antenna 21 and the floating metal antenna 41. As shown in FIG. 6C, a coupling gap 6 (gap 6) may exist between the feeding slot antenna 21 and the floating metal antenna 41, and a coupling area 6 may be formed between the feeding slot antenna 21 and the floating metal antenna 41. The coupling gap 6 may be equal to the coupling gap 3 in Embodiment 2, and the coupling area 6 may be equal to the coupling area 3 in Embodiment 2. Specific values of the coupling gap 6 and the coupling area 6 are not limited in this application, provided that the feeding slot antenna 21 can be coupled to the floating metal antenna 41.

To meet clearance requirements of the slot antenna 21 and the floating metal antenna 41 in the coupling antenna structure, for a position relationship between the slot antenna 21, the floating metal antenna 41, and a surrounding metal component (such as a PCB), refer to related descriptions in Embodiment 1.

The following describes resonance modes that can be generated by the coupling antenna structures in the examples shown in FIG. 6A and FIG. 6B.

Figure 6D:
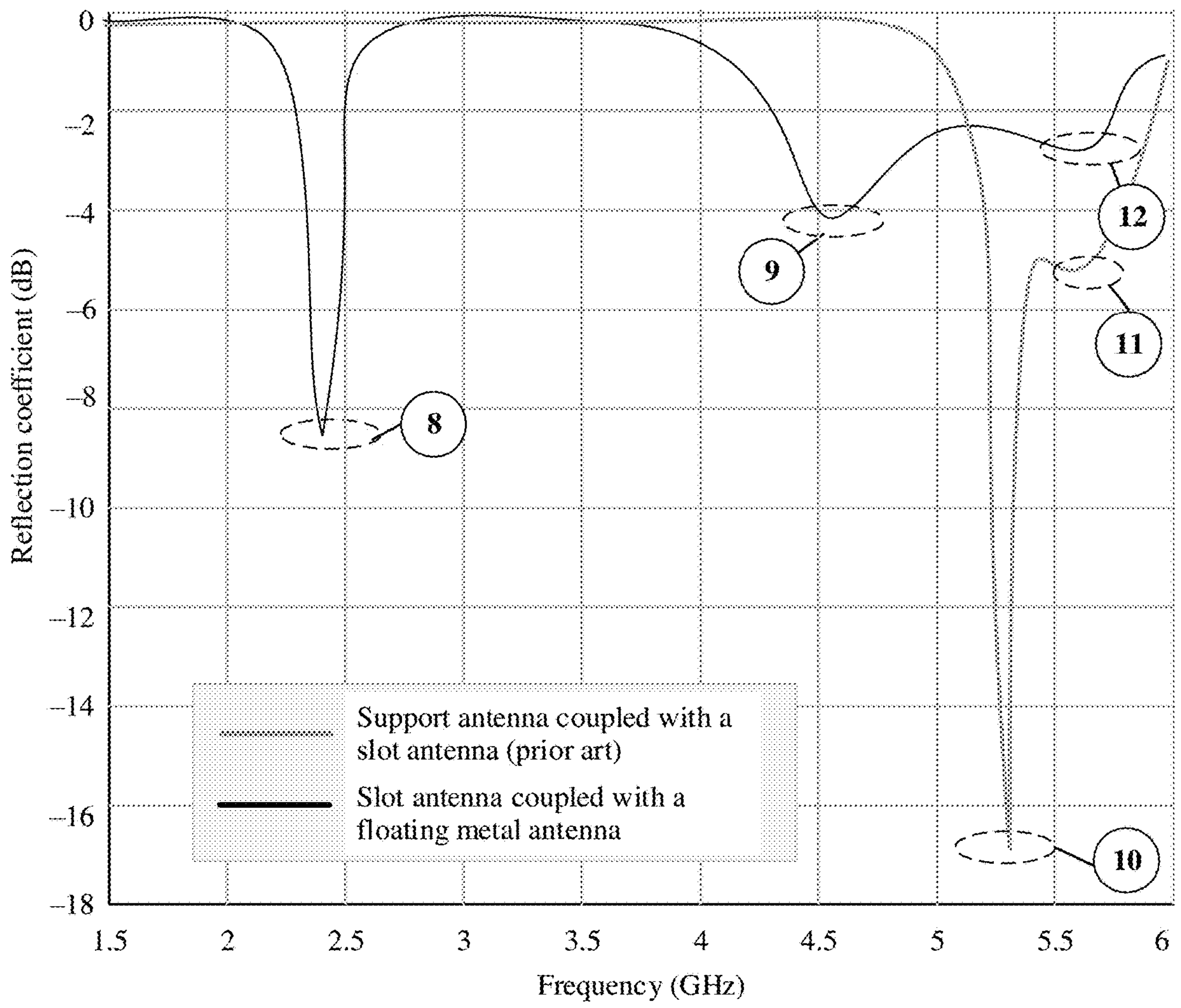

Referring to FIGS. 6D, 8, 9, and 12 in FIG. 6D represent different resonances. The coupling antenna structure may generate a resonance 8 near 2.4 GHz, and may further generate two resonances 9 and 12 near 5 GHz. Details are as follows:

The resonance 8 may be generated in a half-wavelength mode of the floating metal antenna 41. In the two resonances 9 and 12 near 5 GHz, a lower resonance (that is, the resonance 9) may be generated in a one-time wavelength mode of the floating metal antenna 41, and a higher resonance (that is, the resonance 12) may be generated in a half-wavelength mode of the slot antenna 21.

In other words, the feeding slot antenna 21 may be coupled to the floating metal antenna 41, generate a plurality of resonances, and cover a plurality of frequency bands. Specifically, the feeding slot antenna 21 may generate the resonance 12, and may be coupled to the floating metal antenna 41, to excite the floating metal antenna 41 to generate the resonance 8 and the resonance 9.

A wavelength mode in which the floating metal antenna 41 generates the resonance 8 is not limited, and the resonance 8 may alternatively be generated in the one-time wavelength mode, a three-half-wavelength mode, or the like of the floating metal antenna 41. A wavelength mode in which the floating metal antenna 41 generates the resonance 9 is not limited, and the resonance 9 may alternatively be generated in a three-half-wavelength mode, a five-half-wavelength mode, or the like of the floating metal antenna 41. A wavelength mode in which the slot antenna 21 generates the resonance 12 is not limited, and the resonance 12 may alternatively be generated in a three-half-wavelength mode, a five-half-wavelength mode, or the like of the slot antenna 21.

In other words, the feeding slot antenna 21 may be coupled to the floating metal antenna 41, generate resonance of a plurality of Wi-Fi frequency bands, and cover the plurality of Wi-Fi frequency bands.

The coupling antenna structure in the examples shown in FIG. 6A and FIG. 6B may further generate a resonance of another frequency band, not limited to the 2.4 GHz frequency band and the 5 GHz frequency band. This may be specifically set by adjusting a size or a shape of each antenna radiator (for example, the floating metal antenna 41 and the slot antenna 21) in the antenna structure.

FIG. 6D further shows a resonance mode generated by a conventional coupling antenna structure, for example, a coupling antenna structure (referring to FIG. 3G) in which the support antenna 31 is coupled to the slot antenna 21. Because design space of the support antenna 31 is limited, and a design size of the support antenna is very small, in this conventional coupling antenna structure, only two resonances 10 and 11 can be generated near 5 GHz, and no resonance can be generated near 2.4 GHz.

It can be learned that, compared with the conventional coupling antenna structure shown in FIG. 3G, the coupling antenna structure in the examples shown in FIG. 6A and FIG. 6B includes the floating metal antenna disposed on the rear cover, a size of the floating metal antenna may be designed to be relatively large, and a coupling antenna structure formed by the floating metal antenna and the feeding slot antenna can excite a resonance mode of a lower frequency band, generate more resonances, and implement coverage of more frequency bands.

The following compares and analyzes performance of several typical coupling antenna structures described in the foregoing content: the coupling antenna structure (which is referred to as a structure D for short below) in the example shown in FIG. 3G, the coupling antenna structure (which is referred to as a structure E for short below) in the example shown in FIG. 5A, and the coupling antenna structure (which is referred to as a structure F for short below) in the example shown in FIG. 3A.

Figure 7A:
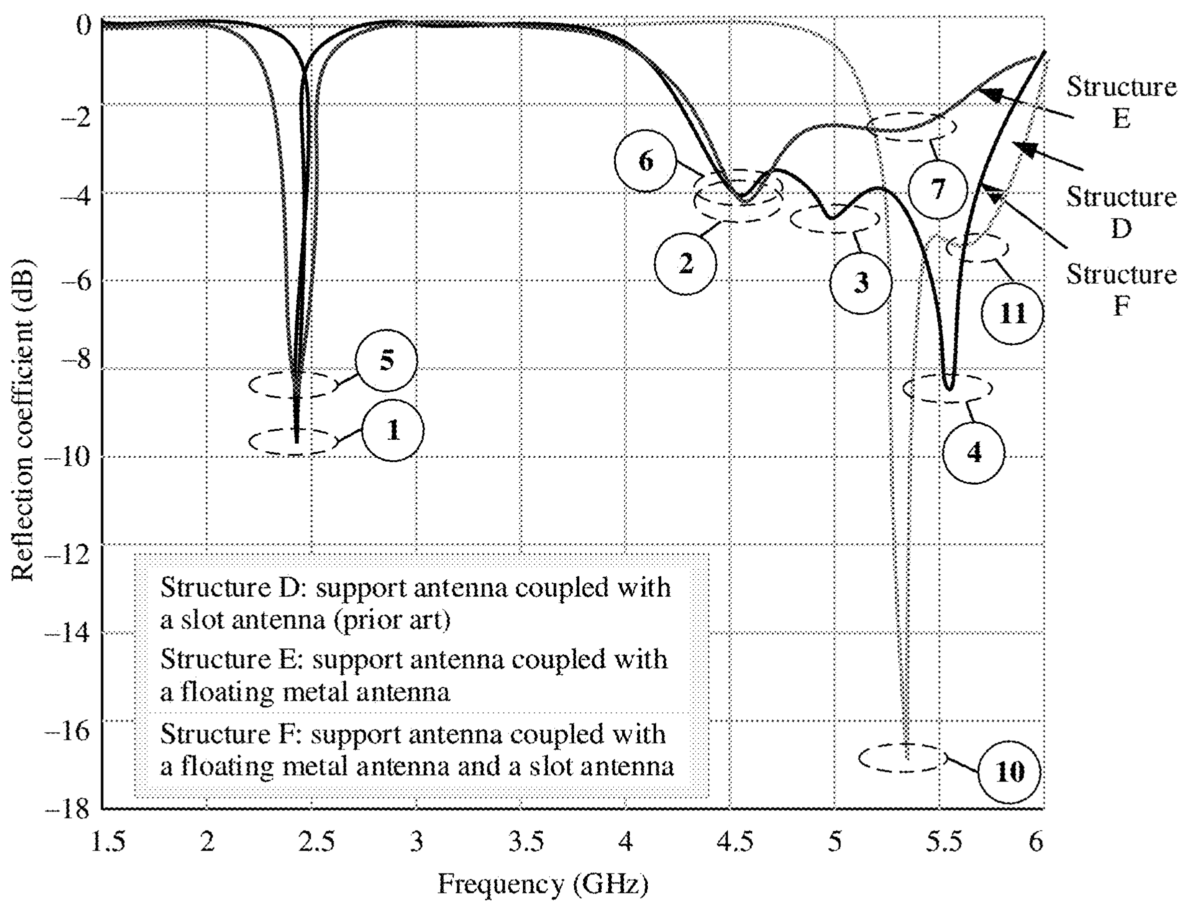
FIG. 7A and FIG. 7B are schematic diagrams of an antenna apparatus according to still another embodiment of this application.

FIG. 7A shows a group of simulated antenna reflection coefficient curves, including a reflection coefficient curve corresponding to the structure D, a reflection coefficient curve corresponding to the structure E, and a reflection coefficient curve corresponding to the structure F.

In the reflection coefficient curve corresponding to the structure D, the antenna may have the two resonances 10 and 11 that work near 5.5 GHz. A lower resonance (that is, the resonance 10) may be generated by the support antenna 31 (in a quarter-wavelength mode), and a higher resonance (that is, the resonance 11) may be generated in the half-wavelength mode of the slot antenna 21.

In the reflection coefficient curve corresponding to the structure E, a resonance (that is, the resonance 5) of the antenna near 2.5 GHz may be generated in the half-wavelength mode of the floating metal antenna 41. The antenna may further have two resonances near 5 GHz, where a lower resonance (that is, the resonance 6) may be generated in the one-time wavelength mode of the floating metal antenna 41, and a higher resonance (that is, the resonance 7) may be generated by the support antenna 31 (in the quarter-wavelength mode).

In the reflection coefficient curve corresponding to the structure F, a resonance (that is, the resonance 1) of the antenna near 2.5 GHz may be generated in the half-wavelength mode of the floating metal antenna 41. The antenna may further have three resonances near 5 GHz, where a lowest resonance (that is, the resonance 2) may be generated in the one-time wavelength mode of the floating metal antenna, an intermediate resonance (that is, the resonance 3) may be generated by the support antenna (in the quarter-wavelength mode), and a highest resonance (that is, the resonance 4) may be generated in the half-wavelength mode of the slot antenna.

It can be learned that, compared with the structure D which can generate only two resonances near 5.5 GHz, the structure E and the structure F may further generate a resonance near 2.4 GHz. The structure E and the structure F are coupling antenna structures formed by coupling the feeding antenna to the floating metal antenna, and a design size of the floating metal antenna may be greater than design sizes of the support antenna and the slot antenna. Therefore, such coupling antenna structures may further generate a resonance near 2.4 GHz.

It can be learned that, compared with the structure E in which two resonances may be generated near 5 GHz, in the structure F, three resonances may be generated near 5 GHz. Because the feeding support antenna in the structure F is coupled to both the floating metal antenna and the slot antenna, the structure F can excite more resonance modes and can cover more frequency bands.

Figure 7B:
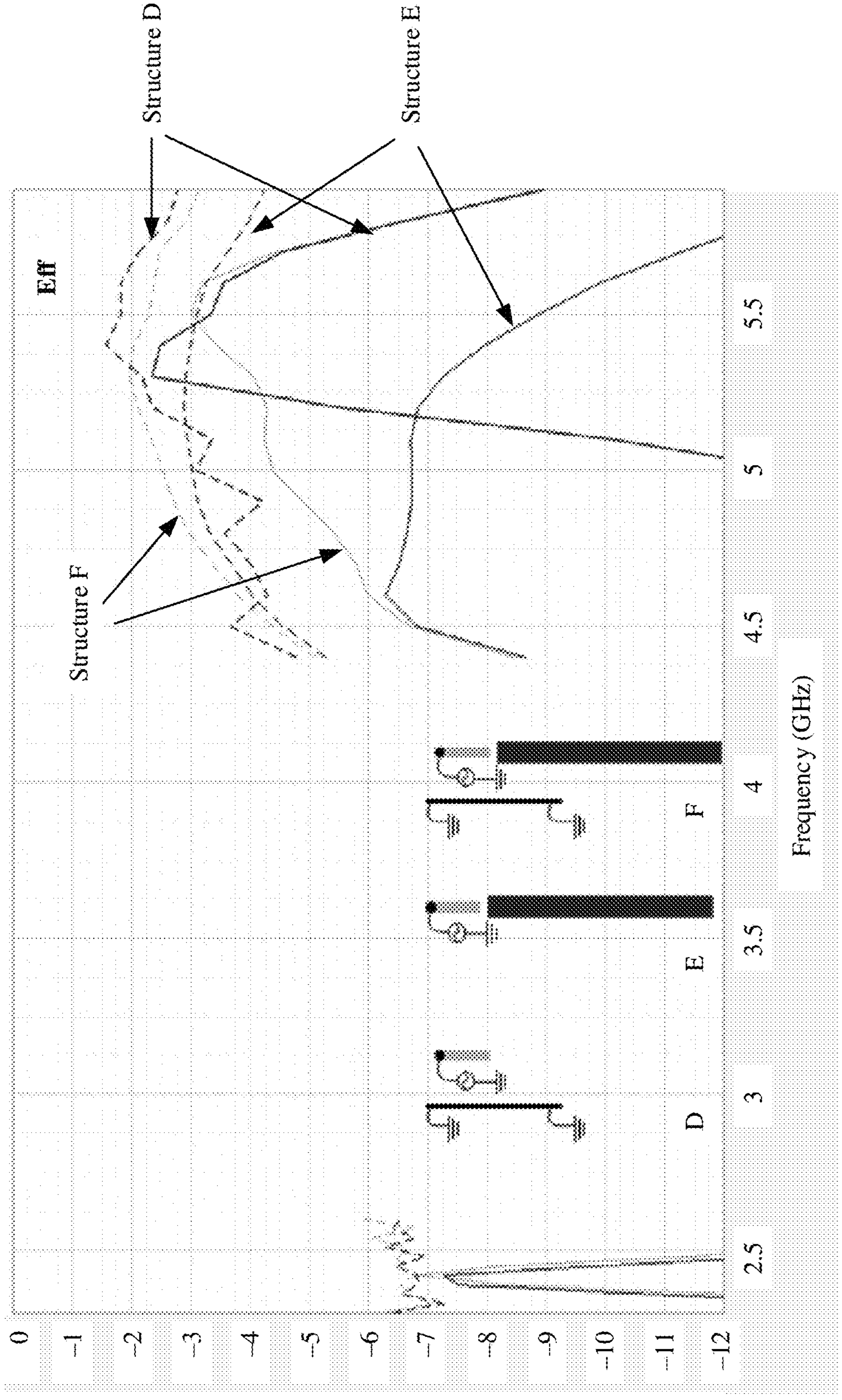

In addition, FIG. 7B shows efficiency curves of simulation of the three coupling antenna structures: the structure D, the structure E, and the structure F. A solid line represents a system efficiency curve, and a dashed line represents a radiation efficiency curve. It can be learned through comparison of the efficiency curves of the several structures that, radiation efficiency of a coupling antenna structure (the structure E or the structure F) formed by coupling a feeding antenna to the floating metal antenna is relatively high near 2.4 GHz and 5 GHz, and there is no obvious efficiency concave.

It can be learned from Embodiment 1 to Embodiment 4 that a coupling antenna structure may be formed by coupling the feeding antenna to the floating metal antenna. The antenna apparatus of the coupling antenna structure includes the floating metal antenna disposed on the rear cover. A size of the floating metal antenna may be designed to be relatively large. The coupling antenna structure formed by the floating metal antenna and the feeding antenna may excite a resonance mode of a relatively low frequency band, generate more resonances, and improve antenna bandwidth and radiation characteristics. The feeding antenna may be an antenna fastened on an antenna support (which may be referred to as a support antenna). The feeding support antenna may further be coupled to both the floating metal antenna and the slot antenna, so that more resonance modes can be excited. Alternatively, the feeding antenna may be a slot antenna formed by slitting on the metal middle frame 23. The feeding slot antenna may be coupled to both the floating metal antenna and the support antenna, so that more resonance modes can be excited.

Embodiment 5

In Embodiment 5, a support antenna may be a feeding unit, and two or more floating metal antennas may be coupling units. In other words, a feeding support antenna may be coupled to two or more floating metal antennas at the same time.

The following uses a coupling antenna structure in which the feeding support antenna is coupled to two floating metal antennas as an example for description.

Figure 8A:
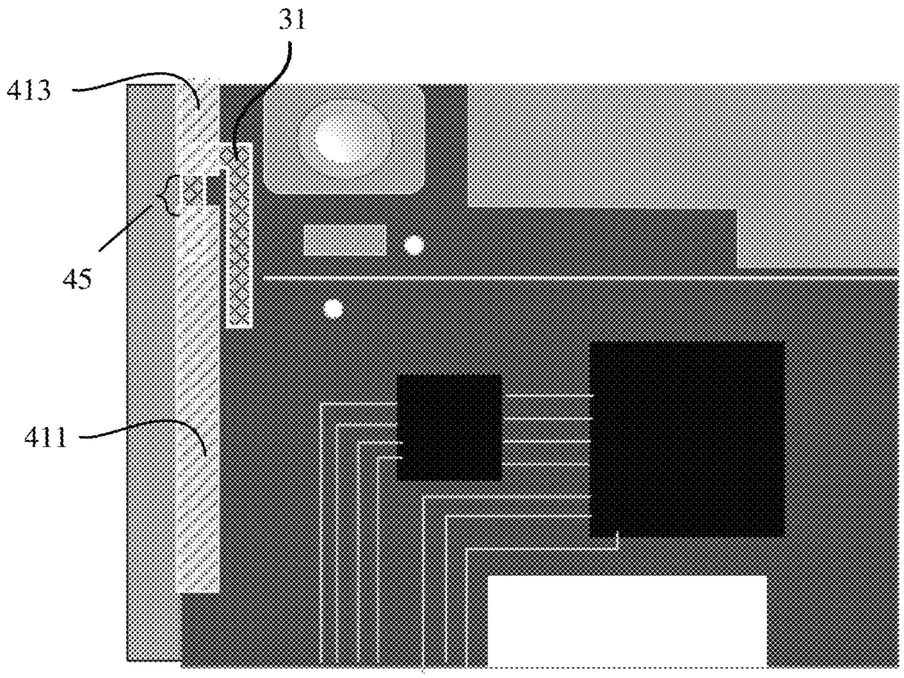
FIG. 8A to FIG. 8G are schematic diagrams of an antenna apparatus according to still another embodiment of this application.
Figure 8B:
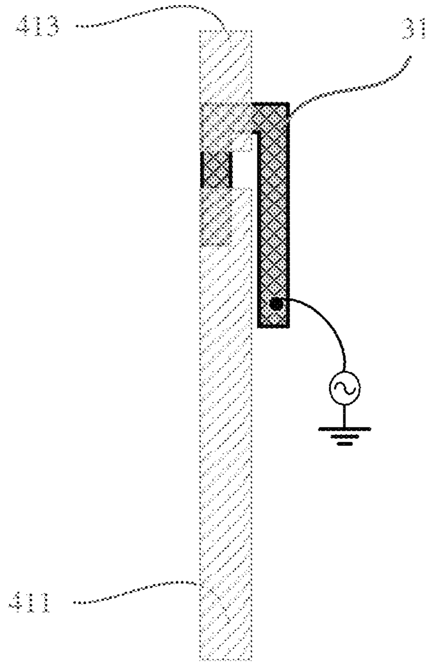

FIG. 8A and FIG. 8B show examples of a coupling antenna structure according to Embodiment 5. FIG. 8A is a schematic diagram of a simulation model, and FIG. 8B is a simplified structural diagram. As shown in FIG. 8A and FIG. 8B, the coupling antenna structure may include a support antenna 31, a floating metal antenna 413, and a floating metal antenna 411.

The support antenna 31 may be fastened on an antenna support (not shown). The support antenna 31 may have a feeding point. The support antenna 31 may have one end feeding power, and the other end being open. Both the floating metal antenna 413 and the floating metal antenna 411 may be disposed on an inner surface of a rear cover, and a gap 45 may be provided between the floating metal antenna 413 and the floating metal antenna 411. The floating metal antenna 411 may be longer than the floating metal antenna 413. The floating metal antenna may have both ends being open.

The feeding support antenna 31 and the floating metal antenna 413 may be disposed in parallel and opposite to each other. The feeding support antenna 31 and the floating metal antenna 411 may be disposed in parallel and opposite to each other. Herein, the parallel and opposite disposition may mean that one or more radiation arms of the support antenna 31 may be disposed in parallel and opposite to the floating metal antenna.

Figure 8C:
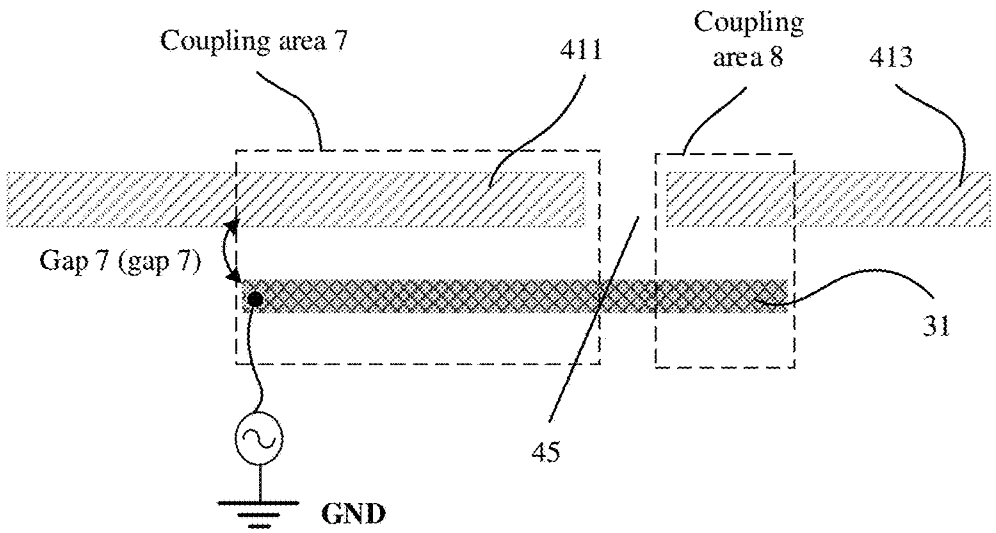

FIG. 8C shows an example of coupling gaps between the feeding support antenna 31 and the floating metal antenna 413 and between the feeding support antenna 31 and the floating metal antenna 411. As shown in FIG. 8C, a coupling gap between the feeding support antenna 31 and the floating metal antenna 411 may be the same as a coupling gap, that is, a coupling gap 7 (gap 7), between the feeding support antenna 31 and the floating metal antenna 413. A coupling area 7 may be formed between the feeding support antenna 31 and the floating metal antenna 411, and a coupling area 8 may be formed between the feeding support antenna 31 and the floating metal antenna 413. A value of the coupling gap 7, a value of the coupling area 7, and a value of the coupling area 8 are not limited in this application, provided that the feeding support antenna 31 can be coupled to both the floating metal antenna 413 and the floating metal antenna 411.

To meet clearance requirements of the support antenna 31 and the floating metal antennas (the floating metal antenna 413 and the floating metal antenna 411) in the coupling antenna structure, for a position relationship between the support antenna 31, the floating metal antennas, and a surrounding metal component (such as a PCB), refer to related descriptions in Embodiment 1.

The following describes resonance modes that can be generated by the coupling antenna structure in the examples shown in FIG. 8A and FIG. 8B.

Figure 8D:
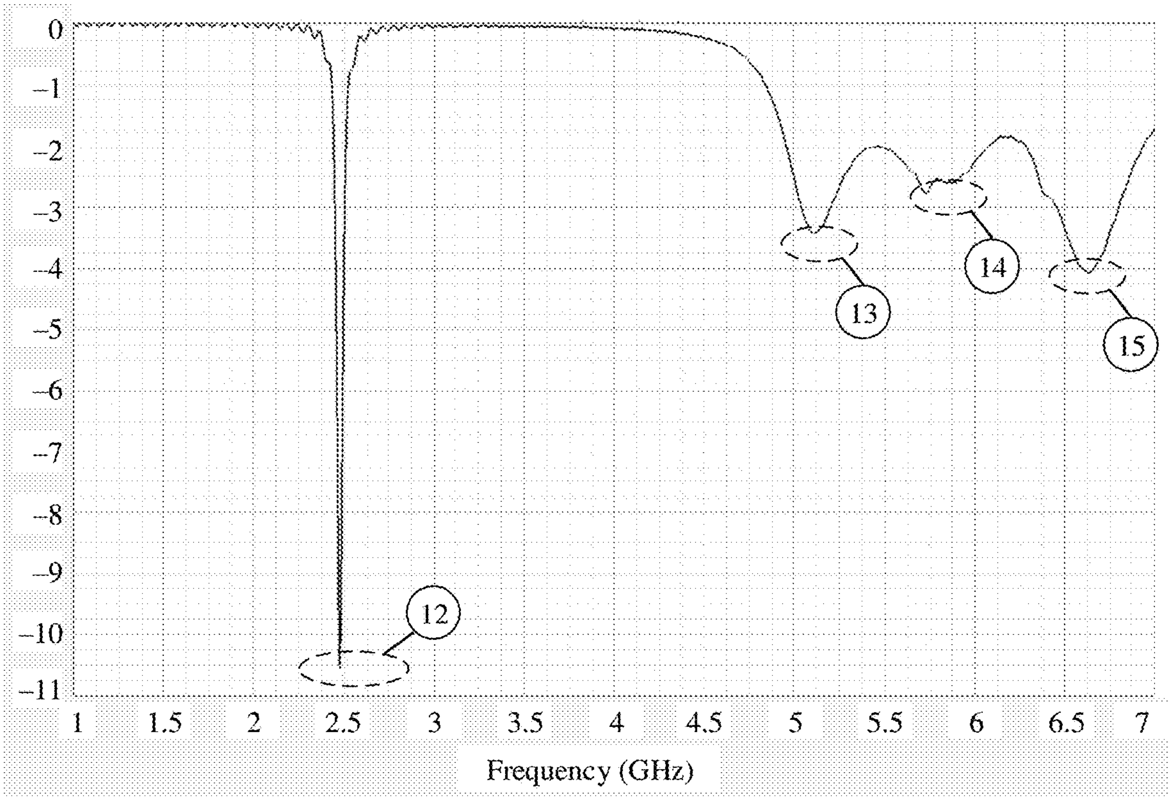

Referring to FIGS. 8D, 12, 13, 14, and 15 in FIG. 8D represent different resonances. The coupling antenna structure may generate a resonance 12 near 2.4 GHz, and may further generate three resonances 13, 14, and 15 near 5 GHz. Details are as follows:

The resonance 12 may be generated in a half-wavelength mode of the floating metal antenna 411. In the three resonances 13, 14, and 15 near 5 GHz, a lowest resonance (that is, the resonance 13) may be generated by the support antenna (for example, in a quarter-wavelength mode), an intermediate resonance (that is, the resonance 14) may be generated in a one-time wavelength mode of the floating metal antenna 411, and a highest resonance (that is, the resonance 15) may be generated in a half-wavelength mode or a one-time wavelength mode of the floating metal antenna 413.

Figure 8E:
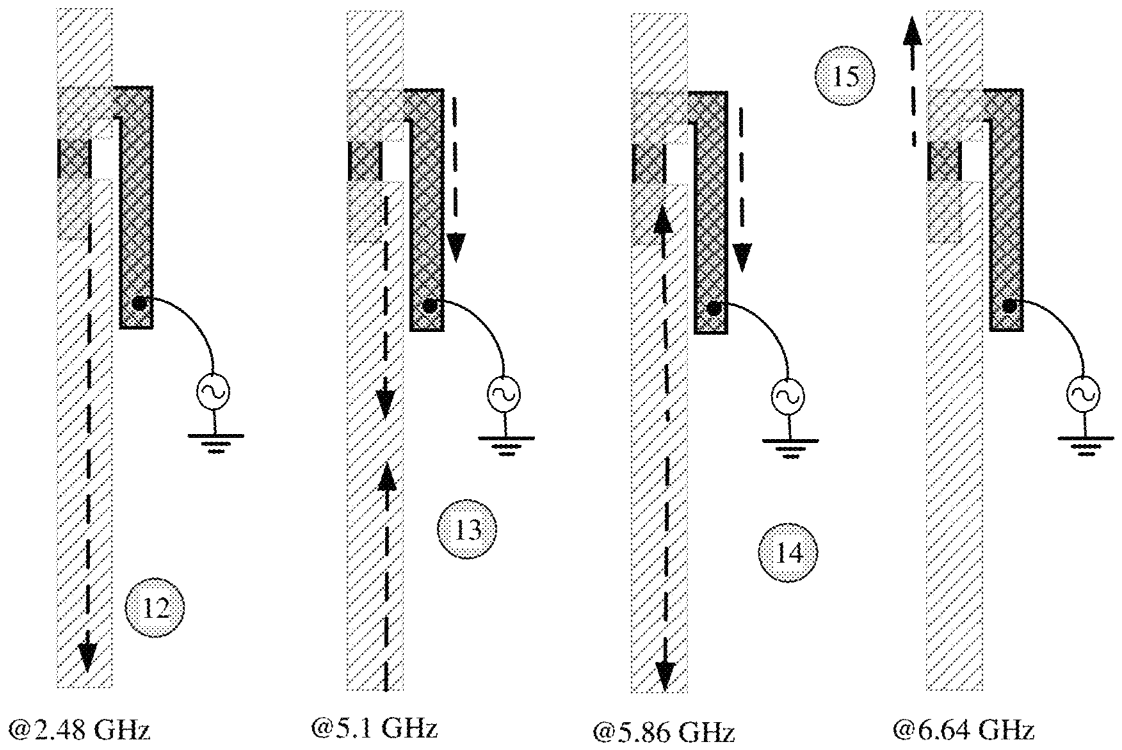
Figure 8F:
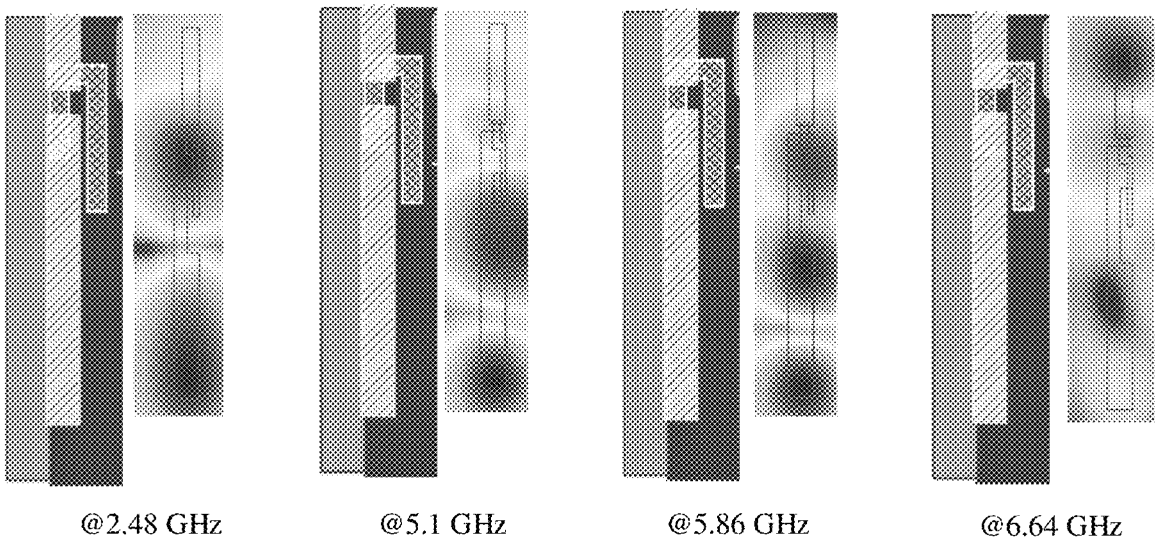

FIG. 8E shows an example of current distribution of the resonances 12, 13, 14, and 15. FIG. 8E shows an example of electric field distribution of the resonances 12, 13, 14, and 15. It can be learned from current distribution and electric field distribution of the resonance 12 that, two ends (both are open ends) of a relatively long floating metal antenna (that is, the floating metal antenna 411) are strong electric field points, and a signal of the resonance 12 may be radiated in the half-wavelength mode of the relatively long floating metal antenna. It can be learned from the current distribution and the electric field distribution of the resonance 13 that, one end (a feeding end) of the support antenna 31 is a strong current point, the other end (an open end) of the support antenna 31 is a strong electric field point, and a signal of the resonance 13 may be radiated in the quarter-wavelength mode of the support antenna 31. It can be learned from current distribution and electric field distribution of the resonance 14 that, two ends (both are open ends) of a relatively long floating metal antenna (that is, the floating metal antenna 411) are strong electric field points, a middle position is also a strong electric field point, and a signal of the resonance 14 may be radiated in the one-time wavelength mode of the relatively long floating metal antenna. It can be learned from current distribution and electric field distribution of the resonance 15 that, two ends (both are open ends) of a relatively short floating metal antenna (that is, the floating metal antenna 413) are strong electric field points, and a signal of the resonance 15 may be radiated in the half-wavelength mode of the relatively short floating metal antenna.

A wavelength mode in which the floating metal antenna 411 generates the resonance 12 is not limited, and the resonance 12 may alternatively be generated in the one-time wavelength mode, a three-half-wavelength mode, or the like of the floating metal antenna 411. A wavelength mode in which the support antenna 31 generates the resonance 13 is not limited, and the resonance 13 may alternatively be generated in a three-quarter-wavelength mode, a five-quarter-wavelength mode, or the like of the support antenna 31. A wavelength mode in which the floating metal antenna 411 generates the resonance 14 is not limited, and the resonance 14 may alternatively be generated in a three-half-wavelength mode, a five-half-wavelength mode, or the like of the floating metal antenna 411. A wavelength mode in which the floating metal antenna 413 generates the resonance 15 is not limited, and the resonance 15 may be generated in a one-time wavelength mode, a three-half-wavelength mode, a five-half-wavelength mode, or the like of the floating metal antenna 413.

It may be understood that, when the feeding support antenna 31 is coupled to at least two floating metal antennas at the same time, the coupling antenna structure may further generate more resonances.

It can be learned that the feeding support antenna 31 may be coupled to a plurality of floating metal antennas at the same time, generate resonances of a plurality of Wi-Fi frequency bands, and cover the plurality of Wi-Fi frequency bands. The coupling antenna structure in the examples shown in FIG. 8A and FIG. 8B may further generate a resonance of another frequency band, not limited to the 2.4 GHz frequency band and the 5 GHz frequency band. This may be specifically set by adjusting a size or a shape of each antenna radiator (for example, the floating metal antenna 411, the floating metal antenna 413, or the support antenna 31) in the antenna structure.

Figure 8G:
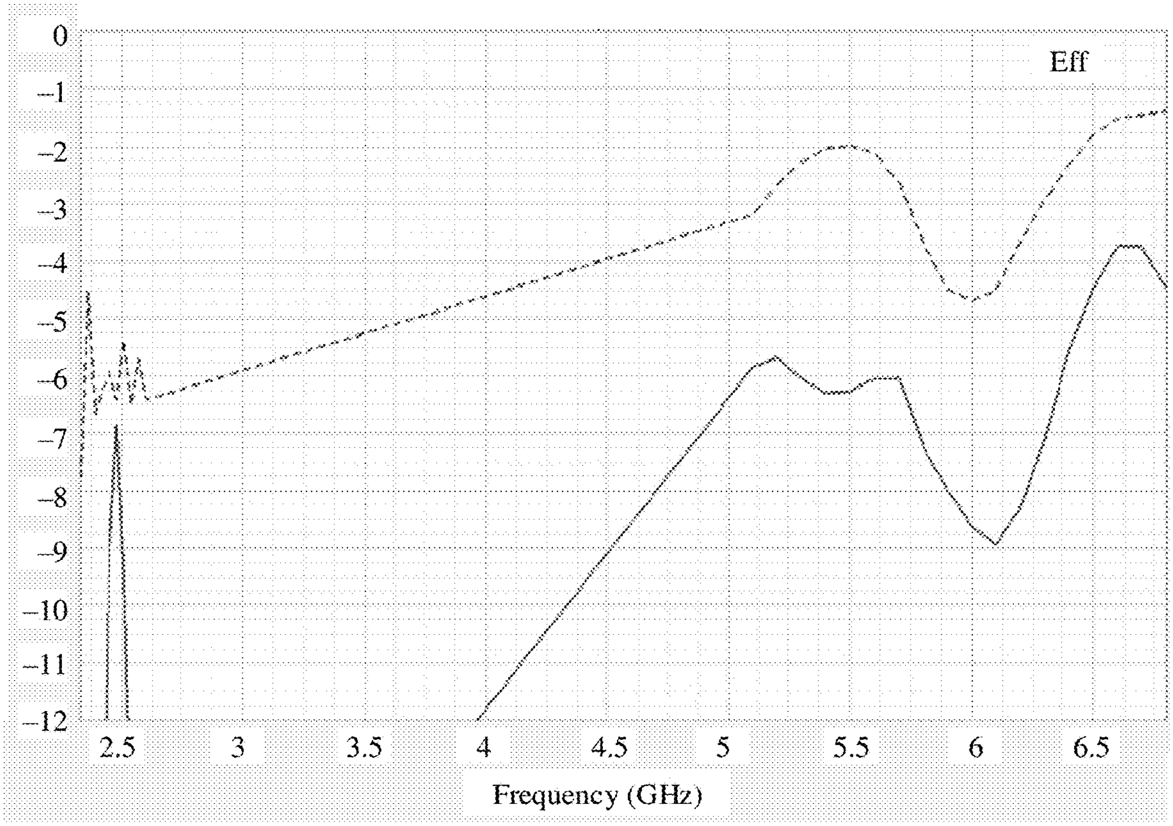

In addition, FIG. 8G shows an efficiency curve of simulation of the coupling antenna structure in the examples shown in FIG. 8A and FIG. 8B. A solid line represents a system efficiency curve, and a dashed line represents a radiation efficiency curve. It can be learned that, radiation efficiency of the coupling antenna structure in the examples shown in FIG. 8A and FIG. 8B is relatively high at each resonance, and there is no obvious efficiency concave.

Embodiment 6

Different from Embodiment 5, a slot antenna is added to a coupling antenna structure. In Embodiment 6, a support antenna may be a feeding unit, and two or more floating metal antennas and the slot antenna may be coupling units. In other words, the feeding support antenna may be coupled to the two or more floating metal antennas and the slot antenna at the same time.

The following uses a coupling antenna structure in which the feeding support antenna is coupled to two floating metal antennas and the slot antenna at the same time as an example for description.

Figure 9A:
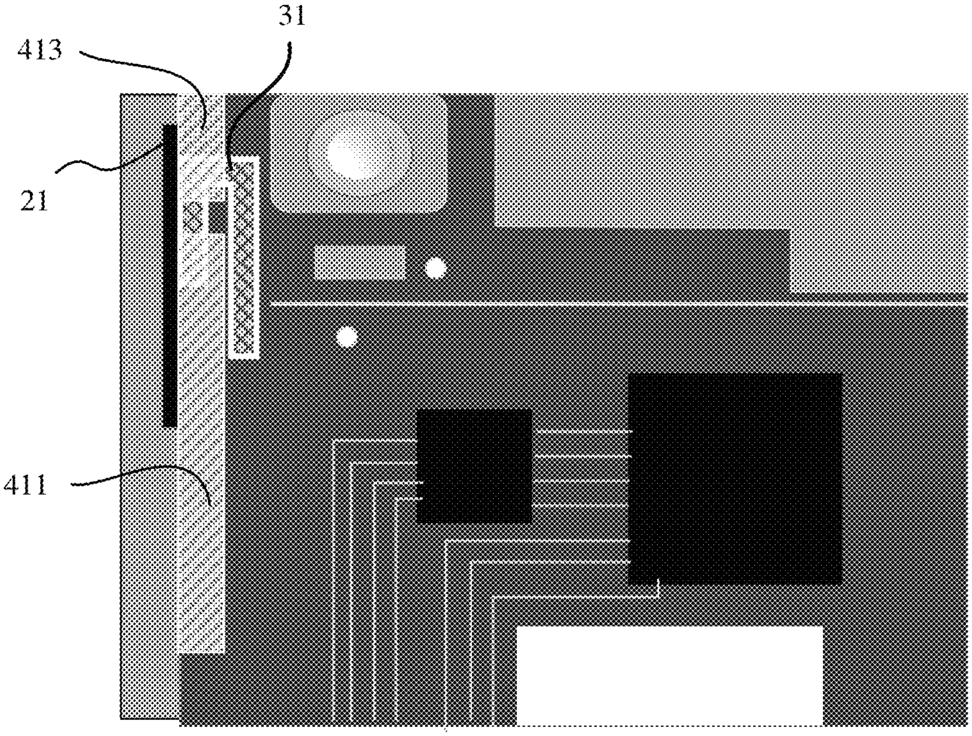
FIG. 9A to FIG. 9C are schematic diagrams of an antenna apparatus according to still another embodiment of this application.
Figure 9B:
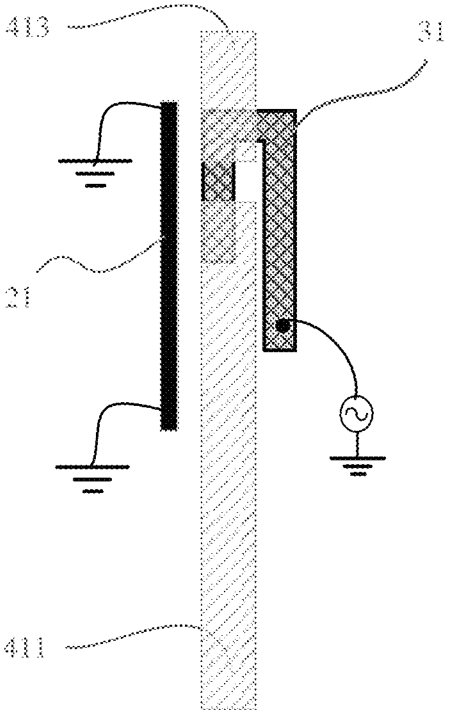

FIG. 9A and FIG. 9B show examples of a coupling antenna structure according to Embodiment 6. FIG. 9A is a schematic diagram of a simulation model, and FIG. 9B is a simplified structural diagram. As shown in FIG. 9A and FIG. 9B, in addition to a support antenna 31, a floating metal antenna 413, and a floating metal antenna 411, the coupling antenna structure may further include a slot antenna 21. The slot antenna 21 may have both ends being closed and grounded. The slot antenna 21 may be disposed in parallel and opposite to the feeding support antenna 31.

Figure 9C:
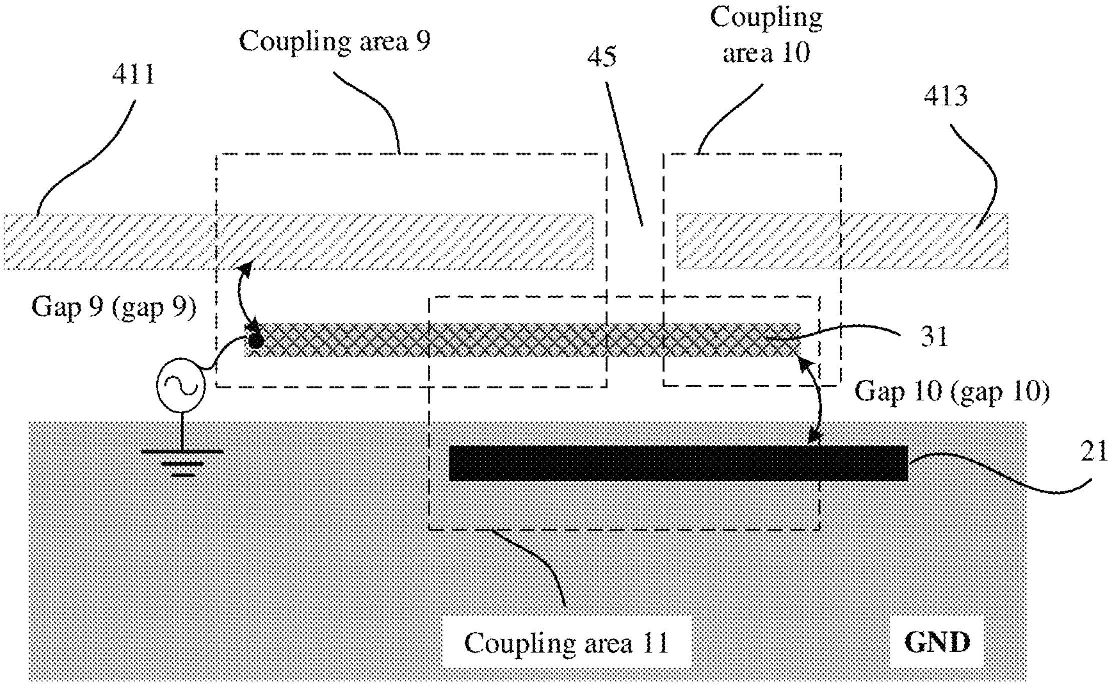

FIG. 9C shows an example of coupling gaps between the feeding support antenna 31 and the floating metal antenna and between the feeding support antenna 31 and the slot antenna 21. As shown in FIG. 9C, a coupling gap 9 (gap 9) may exist between the feeding support antenna 31 and the floating metal antenna 411, and a coupling area 9 may be formed between the feeding support antenna 31 and the floating metal antenna 411. The coupling gap 9 (gap 9) may exist between the feeding support antenna 31 and the floating metal antenna 413, and a coupling area 10 may be formed between the feeding support antenna 31 and the floating metal antenna 413. A coupling gap 10 (gap 10) may exist between the feeding support antenna 31 and the slot antenna 21, and a coupling area 11 may be formed between the feeding support antenna 31 and the slot antenna 21. The coupling gap 9 may be equal to the coupling gap 7 in Embodiment 5, and the coupling areas 9 and 10 may be respectively equal to the coupling areas 7 and 8 in Embodiment 5. Specific values of the coupling gaps 9 and 10 and the coupling areas 9, 10, and 11 are not limited in this application, provided that the feeding support antenna 31 can be coupled to the floating metal antenna 411, the floating metal antenna 413, and the slot antenna 21 at the same time.

To meet clearance requirements of the support antenna 31, the slot antenna 21, and the floating metal antennas in the coupling antenna structure, for a position relationship between the support antenna 31, the slot antenna 21, the floating metal antennas, and a surrounding metal component (such as a PCB), refer to related descriptions in Embodiment 1.

Compared with the coupling antenna structure in the examples shown in FIG. 8A and FIG. 8B, in addition to the three resonances 13, 14, and 15 near 5 GHz, the coupling antenna structure in the examples shown in FIG. 9A and FIG. 9B may further generate one more resonance near 5 GHz. The resonance may be generated in a half-wavelength mode of the slot antenna 21. In other words, in addition to a resonance near 2.4 GHz, the coupling antenna structure in the examples shown in FIG. 9A and FIG. 9B may generate four resonances near 5 GHz. In the coupling antenna structure in the examples shown in FIG. 9A and FIG. 9B, the feeding support antenna 31 may be coupled to a plurality of floating metal antennas and the slot antenna 21 at the same time, so that more resonance modes can be excited and more frequency bands can be covered.

The coupling antenna structure in the examples in FIG. 9A and FIG. 9B may further generate a resonance of another frequency band, not limited to the 2.4 GHz frequency band and the 5 GHz frequency band. This may be specifically set by adjusting a size or a shape of each antenna radiator (for example, the floating metal antenna 411, the floating metal antenna 413, the support antenna 31, or the slot antenna 21) in the antenna structure.

In some example implementations, the slot antenna 21 may have one end being closed and grounded, and the other end being open. In this case, the slot antenna 21 may generate the resonance in a quarter-wavelength mode, a three-quarter-wavelength mode, a five-quarter-wavelength mode, or the like.

In some possible implementations, the feeding unit in the coupling antenna structure shown in FIG. 9A may alternatively be the slot antenna 21. In other words, the feeding slot antenna 21 may be coupled to a plurality of floating metal antennas and the support antenna 31 at the same time, so that more resonance modes can be excited and more frequency bands can be covered.

Embodiment 7

Different from Embodiment 6, a coupling antenna structure may have no support antenna.

Figure 10A:
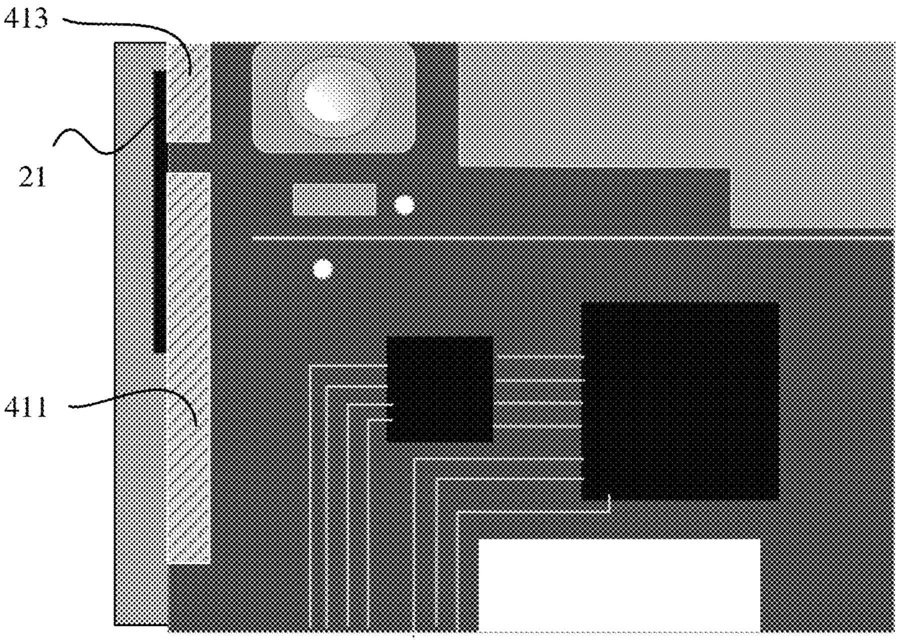
FIG. 10A to FIG. 10C are schematic diagrams of an antenna apparatus according to still another embodiment of this application.
Figure 10B:
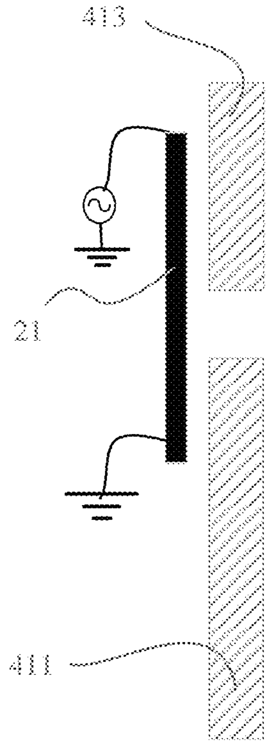

FIG. 10A and FIG. 10B show examples of the coupling antenna structure according to Embodiment 7. FIG. 10A is a schematic diagram of a simulation model, and FIG. 10B is a simplified structural diagram. As shown in FIG. 10A and FIG. 10B, the coupling antenna structure may include a slot antenna 21 and two or more floating metal antennas. The slot antenna 21 may have a feeding point. The slot antenna 21 may have one end feeding power, and the other end being closed and grounded. The slot antenna 21 may be a feeding unit, and the two or more floating metal antennas may be coupling units. The floating metal antenna may have both ends being open. In other words, the feeding slot antenna 21 may be coupled to the two or more floating metal antennas at the same time. The feeding slot antenna 21 may be disposed in parallel and opposite to the floating metal antennas.

Figure 10C:
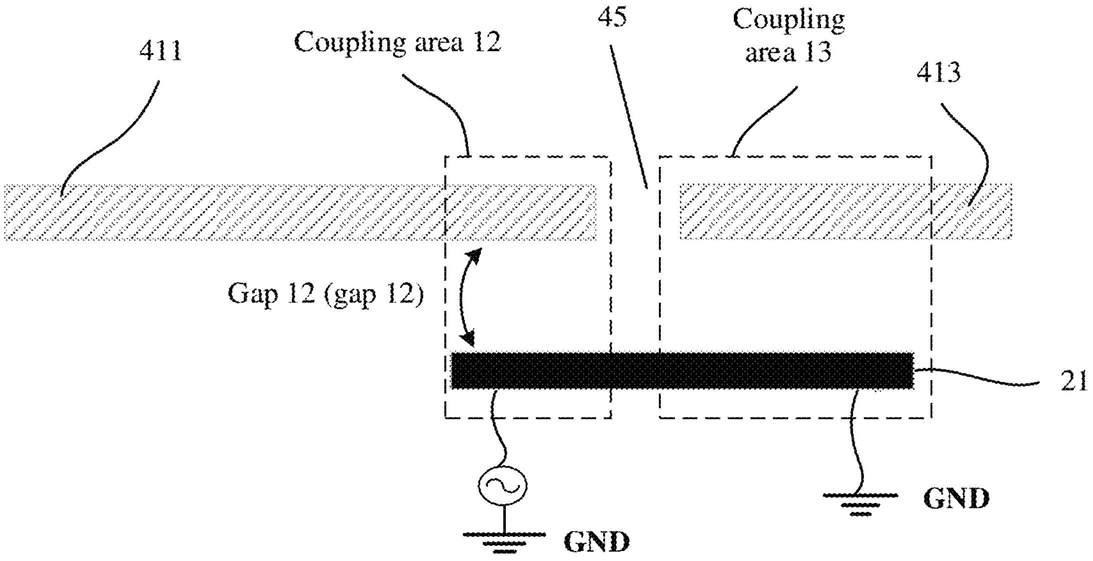

FIG. 10C shows an example of a coupling gap between the feeding slot antenna 21 and the floating metal antennas. As shown in FIG. 10C, a coupling gap 12 (gap 12) may exist between the feeding slot antenna 21 and a floating metal antenna 411, and a coupling area 12 may be formed between the feeding slot antenna 21 and the floating metal antenna 411. A coupling gap 13 (gap 13) may exist between the feeding slot antenna 21 and the floating metal antenna 413, and a coupling area 13 may be formed between the feeding slot antenna 21 and the floating metal antenna 413. Specific values of the coupling gap 12, the coupling area 12, and the coupling area 13 are not limited in this application, provided that the feeding slot antenna 21 can be coupled to both the floating metal antenna 411 and the floating metal antenna 413.

To meet clearance requirements of the slot antenna 21 and the floating metal antennas in the coupling antenna structure, for a position relationship between the slot antenna 21, the floating metal antennas, and a surrounding metal component (such as a PCB), refer to related descriptions in Embodiment 1.

Compared with the coupling antenna structure in the examples shown in FIG. 9A and FIG. 9B, the coupling antenna structure in the examples in FIG. 10A and FIG. 10B generates one less resonance near 5 GHz, and the resonance is a resonance generated by a support antenna (in a quarter-wavelength mode), for example, the resonance 13 in FIG. 8D. In other words, in addition to a resonance near 2.4 GHz, the coupling antenna structure in the examples shown in FIG. 10A and FIG. 10B may generate three resonances near 5 GHz.

Embodiment 8

In Embodiment 8, the coupling antenna structure may generate a resonance of a Wi-Fi frequency band (for example, a 2.4 GHz frequency band), and may further generate a resonance of a mobile communications frequency band (for example, LTE B3, LTE B1, or LTE B7). A frequency band range of LTE B3 is 1710 MHz to 1785 MHz in an uplink and 1805 MHz to 1880 MHz in a downlink. A frequency band range of LTE B1 is 1920 MHz to 1980 MHz in an uplink and 2110 MHz to 2170 MHz in a downlink. A frequency band range of LTE B7 is 2500 MHz to 2570 MHz in an uplink and 2620 MHz to 2690 MHz in a downlink.

Figure 11A:
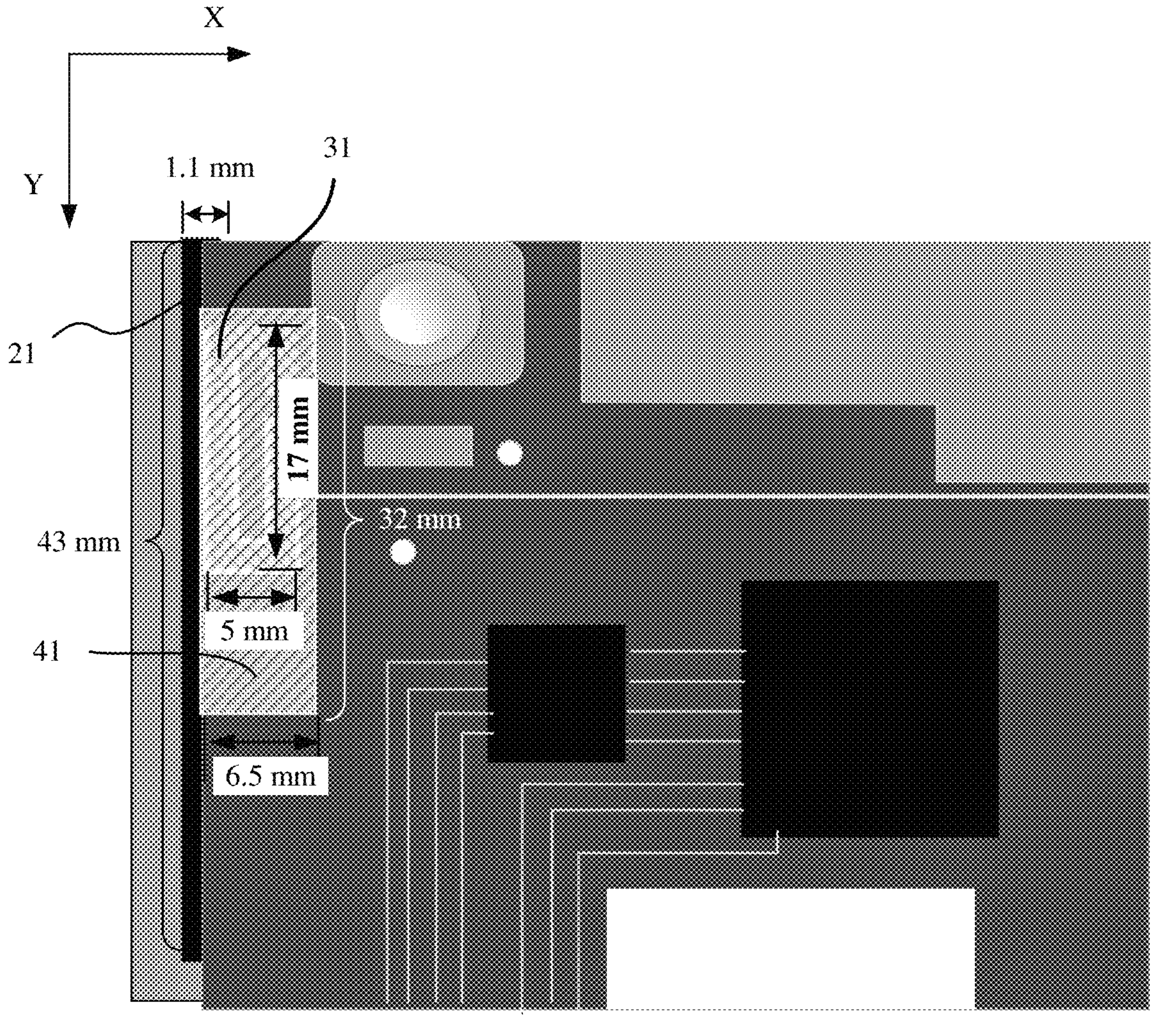
FIG. 11A to FIG. 11H are schematic diagrams of an antenna apparatus according to still another embodiment of this application.
Figure 11B:
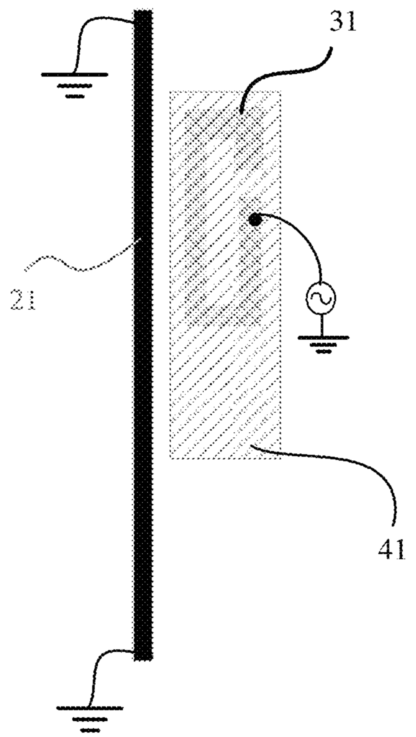

FIG. 11A and FIG. 11B show examples of a coupling antenna structure according to Embodiment 8. FIG. 11A is a schematic diagram of a simulation model, and FIG. 11B is a simplified structural diagram. As shown in FIG. 11A and FIG. 11B, the coupling antenna structure may include a support antenna 31 and a floating metal antenna 41. In some implementations, the coupling antenna structure may further include a slot antenna 21. The slot antenna 21 may have both ends being closed and grounded. The slot antenna 21 may be longer than the floating metal antenna 41.

The support antenna 31 may have a feeding point, and may be a feeding unit. The support antenna 31 may have one end feeding power, and the other end being open. The floating metal antenna 41 and the slot antenna 21 may be coupling units. The floating metal antenna may have both ends being open. The slot antenna may have both ends being closed and grounded. A Z-directed projection area of the floating metal antenna 41 may almost cover the support antenna 31, that is, a coverage rate of the Z-directed projection area of the floating metal antenna 41 to the support antenna 31 may exceed a specific proportion (for example, 80%), to form a relatively large coupling area.

In an example implementation, a length of the slot antenna 21 may be 43 millimeters, or a value near 43 millimeters (for example, a value within 40 millimeters to 45 millimeters). A width of the slot antenna 21 (that is, a width of the slit) may be 1.1 millimeters, or a value near 1.1 millimeters (for example, 1.2 millimeters or 1.0 millimeter). A length of the support antenna 31 may be 17 millimeters, or a value near 17 millimeters (for example, 16 millimeters or 18 millimeters). A width of the support antenna 31 may be 5 millimeters, or a value near 5 millimeters (for example, 6 millimeters or 4 millimeters). A length of the floating metal antenna 41 may be 32 millimeters, or a value near 32 millimeters (for example, 33 millimeters or 32 millimeters). A width of the floating metal antenna 41 may be 6.5 millimeters, or a value near 6.5 millimeters (for example, 6 millimeters or 7 millimeters).

In an example implementation, a Z-directed distance between the support antenna 31 and the floating metal antenna 41 may be 0.15 millimeter to 0.25 millimeter. Outer surface contours of the support antenna 31 and the floating metal antenna 41 may have some radians, and there may be a plurality of different Z-directed distances between the support antenna 31 and the floating metal antenna 41. A maximum Z-directed distance between the support antenna 31 and the floating metal antenna 41 may be 0.25 millimeter, and a minimum Z-directed distance between the support antenna 31 and the floating metal antenna 41 may be 0.15 millimeter. A Z-directed projection area of the floating metal antenna 41 may not cover the support antenna 31, or may cover only a small part of the support antenna 31 (for example, 20% of the support antenna 31).

In an example implementation, a Z-directed distance between the support antenna 31 and the slot antenna 21 may be 2 millimeters, or a value near 2 millimeters (for example, 1.8 millimeters or 2.2 millimeters). An X-direction distance between the support antenna 31 and the slot antenna 21 may be within 5 millimeters.

The following describes resonance modes that can be generated by the coupling antenna structure in the examples shown in FIG. 11A and FIG. 11B.

Figure 11C:
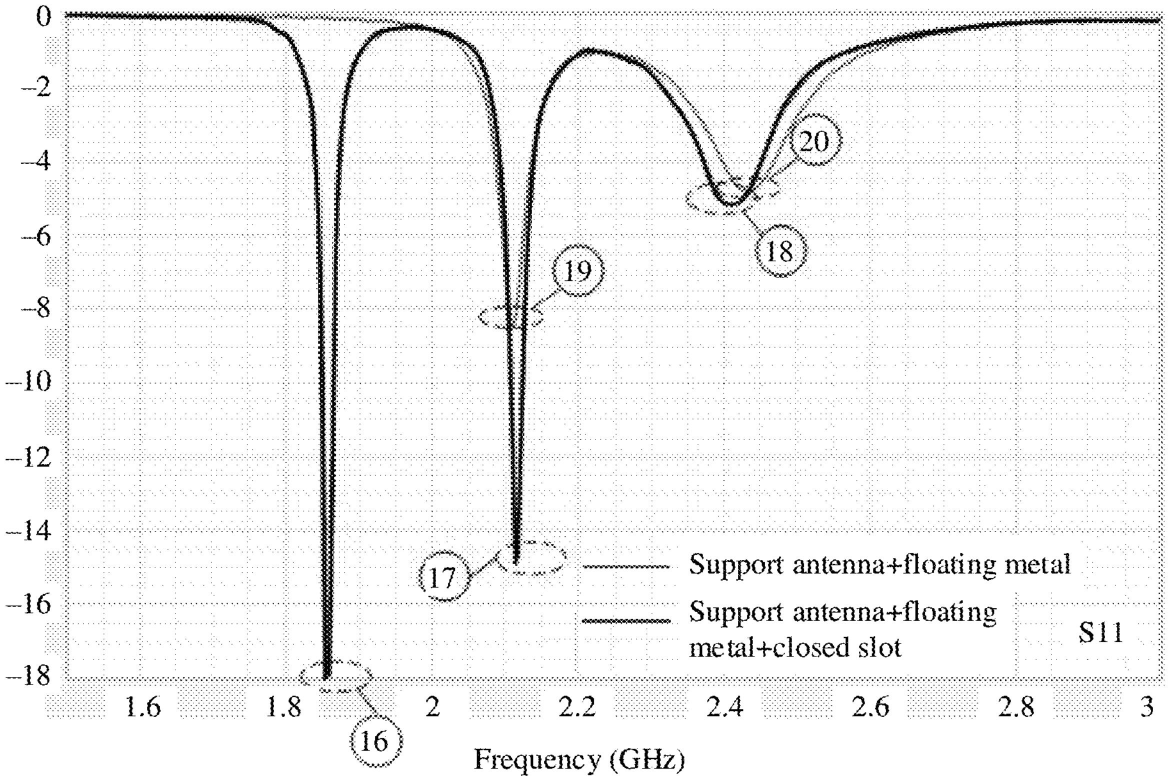

Referring to FIGS. 11C, 16, 17, 18, 19, and 20 in FIG. 11C represent different resonances.

As shown in FIG. 11C, a coupling antenna structure formed by coupling the feeding support antenna 31 to both the floating metal antenna 41 and the slot antenna 21 (that is, the slot antenna 21 is included) may generate a resonance 16 near 1.8 GHz (LTE B3), may further generate a resonance 17 near 2.1 GHz (LTE B1), and may further generate a resonance 18 near 2.4 GHz (LTE B7). Specifically, the resonance 16 may be generated in a half-wavelength mode of the slot antenna 21, the resonance 17 may be generated in a half-wavelength mode of the floating metal antenna 41, and the resonance 18 may be generated in a quarter-wavelength mode of the support antenna 31.

Figure 11D:
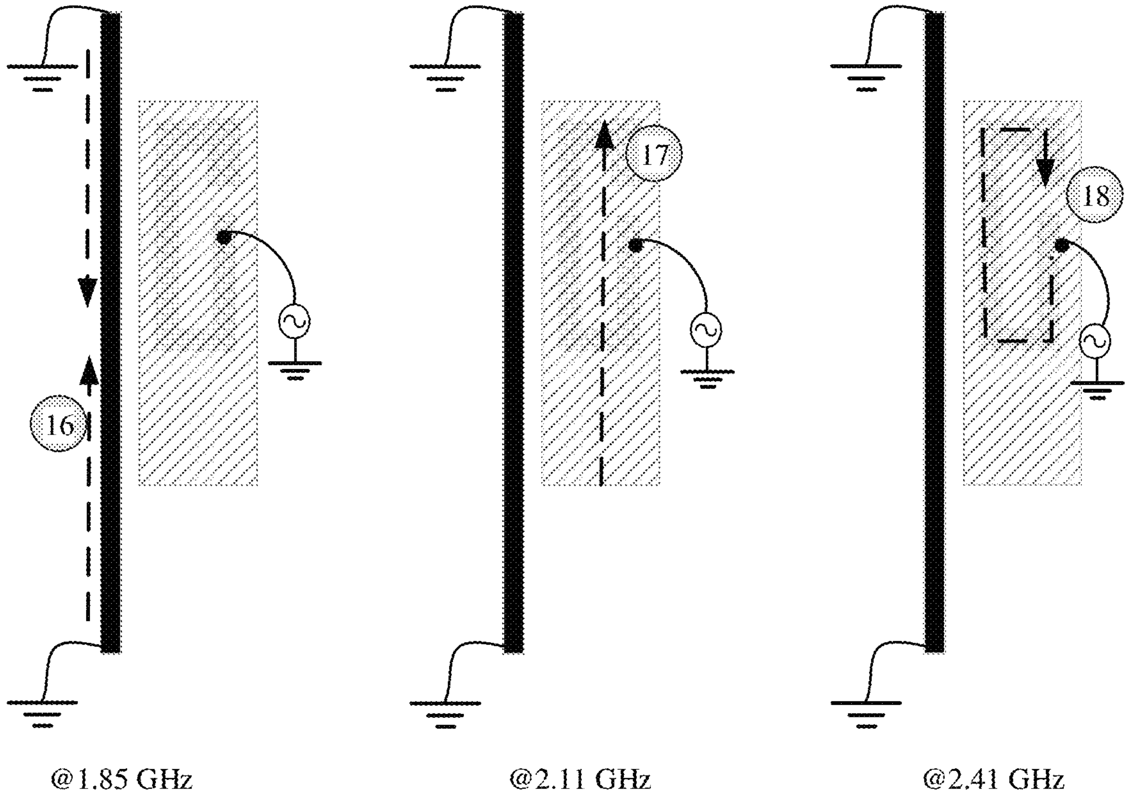
Figure 11E:
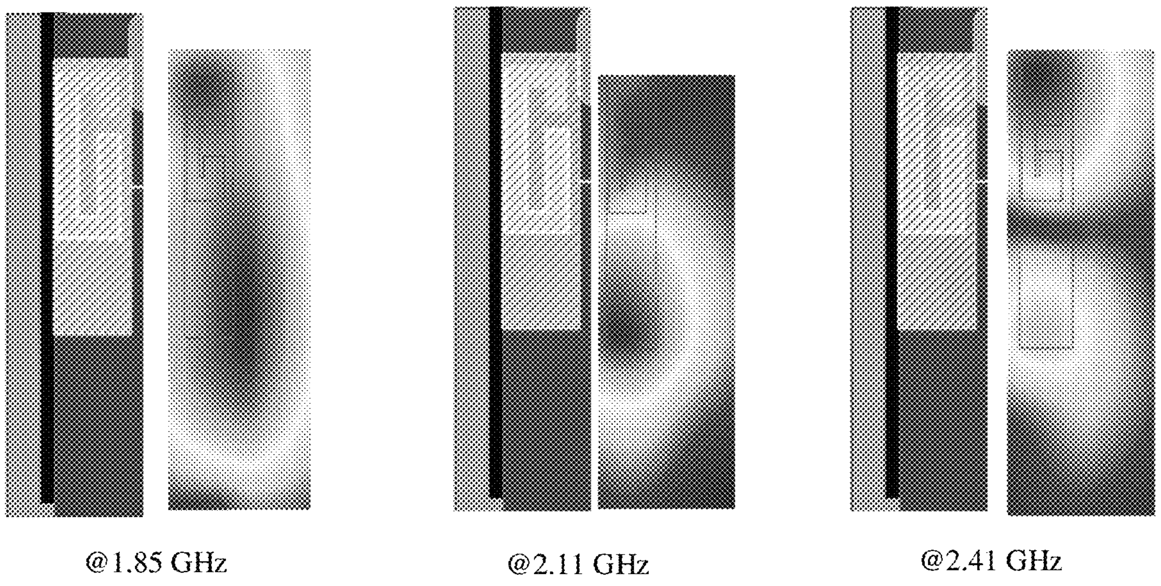

FIG. 11D shows an example of current distribution of the resonances 16, 17, and 18. FIG. 11E shows an example of electric field distribution of the resonances 16, 17, and 18. It can be learned from the current distribution and the electric field distribution of the resonance 16 that, two ends (both are ground ends) of the slot antenna are strong current points, and a signal of the resonance 16 may be radiated in the half-wavelength mode of the slot antenna. It can be learned from the current distribution and the electric field distribution of the resonance 17 that, two ends (both are open ends) of the floating metal antenna 41 are strong electric field points, and a signal of the resonance 17 may be radiated in the half-wavelength mode of the floating metal antenna 41. It can be learned from the current distribution and the electric field distribution of the resonance 18 that, one end (a feeding end) of the support antenna 31 is a strong current point, the other end (an open end) of the support antenna 31 is a strong electric field point, and a signal of the resonance 18 may be radiated in the quarter-wavelength mode of the support antenna 31.

A wavelength mode in which the slot antenna 21 generates the resonance 16 is not limited, and the resonance 16 may alternatively be generated in a three-half-wavelength mode, a five-half-wavelength mode, or the like of the slot antenna 21. A wavelength mode in which the floating metal antenna 41 generates the resonance 17 is not limited, and the resonance 17 may alternatively be generated in a one-time wavelength mode, a three-half-wavelength mode, a five-half-wavelength mode, or the like of the floating metal antenna 41. A wavelength mode in which the support antenna 31 generates the resonance 18 is not limited, and the resonance 18 may alternatively be generated in a three-quarter-wavelength mode, a five-quarter-wavelength mode, or the like of the support antenna 31.

In some example implementations, the slot antenna 21 may have one end being closed and grounded, and the other end being open. In this case, the slot antenna 21 may generate the resonance 16 in a quarter-wavelength mode, a three-quarter-wavelength mode, a five-quarter-wavelength mode, or the like.

FIG. 11C further shows a resonance mode generated by a coupling antenna structure formed by coupling the feeding support antenna 31 to the floating metal antenna 41 (that is, the slot antenna 21 is not included). In this case, the coupling antenna structure may generate a resonance 19 near 2.1 GHz (LTE B1), and may further generate a resonance 20 near 2.4 GHz (LTE B7). Specifically, the resonance 19 may be generated in a half-wavelength mode of the floating metal antenna 41, and the resonance 20 may be generated in a quarter-wavelength mode of the support antenna 31.

A wavelength mode in which the floating metal antenna 41 generates the resonance 19 is not limited, and the resonance 19 may alternatively be generated in a one-time wavelength mode, a three-half-wavelength mode, a five-half-wavelength mode, or the like of the floating metal antenna 41. A wavelength mode in which the support antenna 31 generates the resonance 20 is not limited, and the resonance 20 may alternatively be generated in a three-quarter-wavelength mode, a five-quarter-wavelength mode, or the like of the support antenna 31.

Not limited to the resonances 19 and 20, the coupling antenna structure formed by coupling the feeding support antenna 31 to the floating metal antenna 41 (that is, the slot antenna 21 is not included) may also generate the resonances 16, 17 and 18. In this case, the floating metal antenna 41 may be designed to be longer. In a possible implementation, a length of the floating metal antenna 41 may be 39 millimeters, or a value near 39 millimeters (for example, 38 millimeters or 40 millimeters). In this way, the resonance 16 may be generated in a half-wavelength mode of the floating metal antenna 41, and the resonance 17 may be generated in a one-time wavelength mode of the floating metal antenna 41. The resonance 18 may be generated in a quarter-wavelength mode of the support antenna 31.

It can be learned that the coupling antenna in the examples shown in FIG. 11A and FIG. 11B may generate a plurality of resonances, and cover a Wi-Fi frequency band (for example, a 2.4 GHz frequency band) and frequency bands such as LTE B3, LTE B1, and LTE B7. The coupling antenna structure in the examples shown in FIG. 11A and FIG. 11B may further generate a resonance of another frequency band, not limited to the Wi-Fi frequency band (for example, the 2.4 GHz frequency band) and the frequency bands such as LTE B3, LTE B1, and LTE B7. This may be specifically set by adjusting a size or a shape of each antenna radiator (for example, the floating metal antenna 41, the support antenna 31, or the slot antenna 21) in the antenna structures.

Figure 11F:
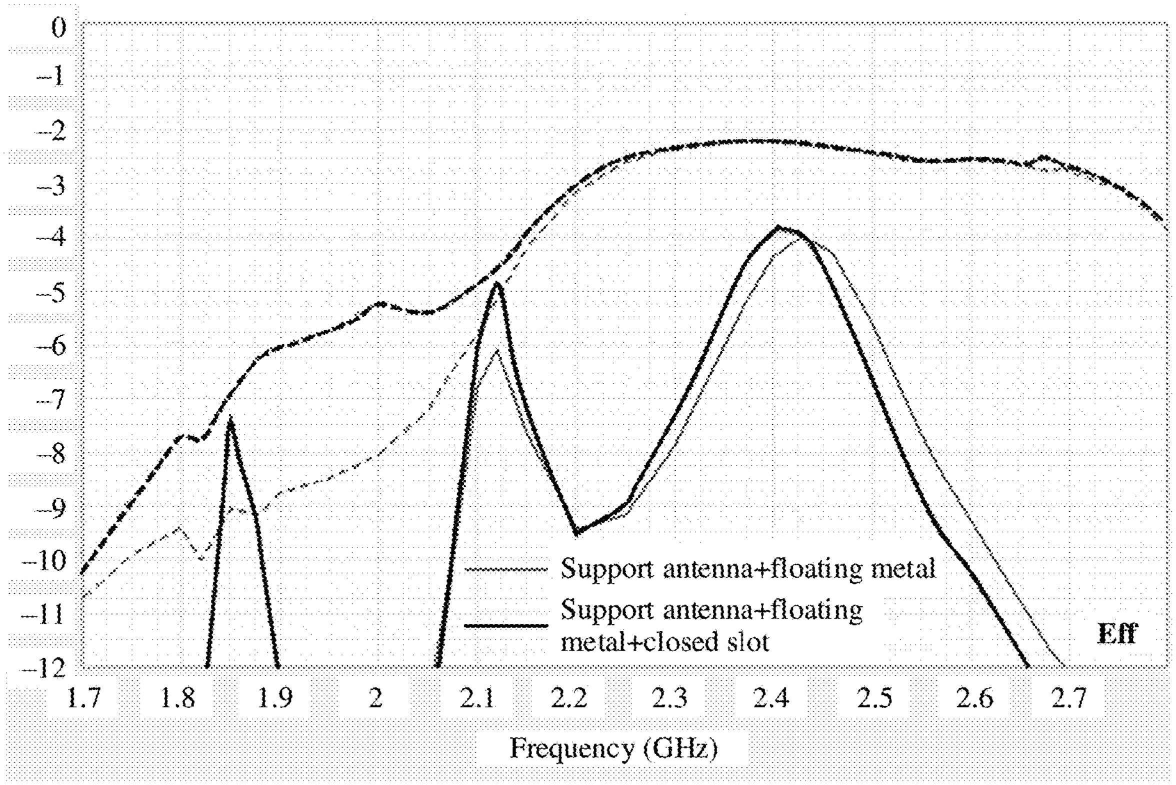

In addition, FIG. 11F shows an efficiency curve of simulation of the coupling antenna structure in the examples shown in FIG. 11A and FIG. 11B. A solid line represents a system efficiency curve, and a dashed line represents a radiation efficiency curve. It can be learned that, radiation efficiency of the coupling antenna structure in the examples shown in FIG. 11A and FIG. 11B is relatively high at each resonance, and there is no obvious efficiency concave.

Figure 11G:
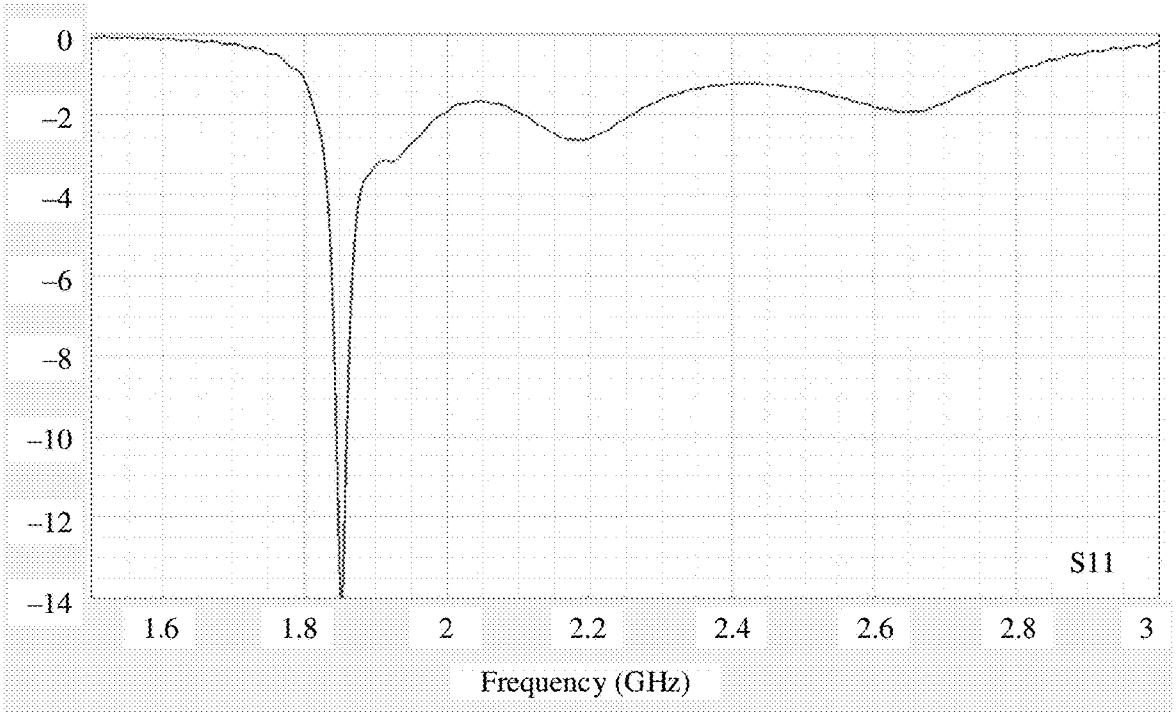
Figure 11H:
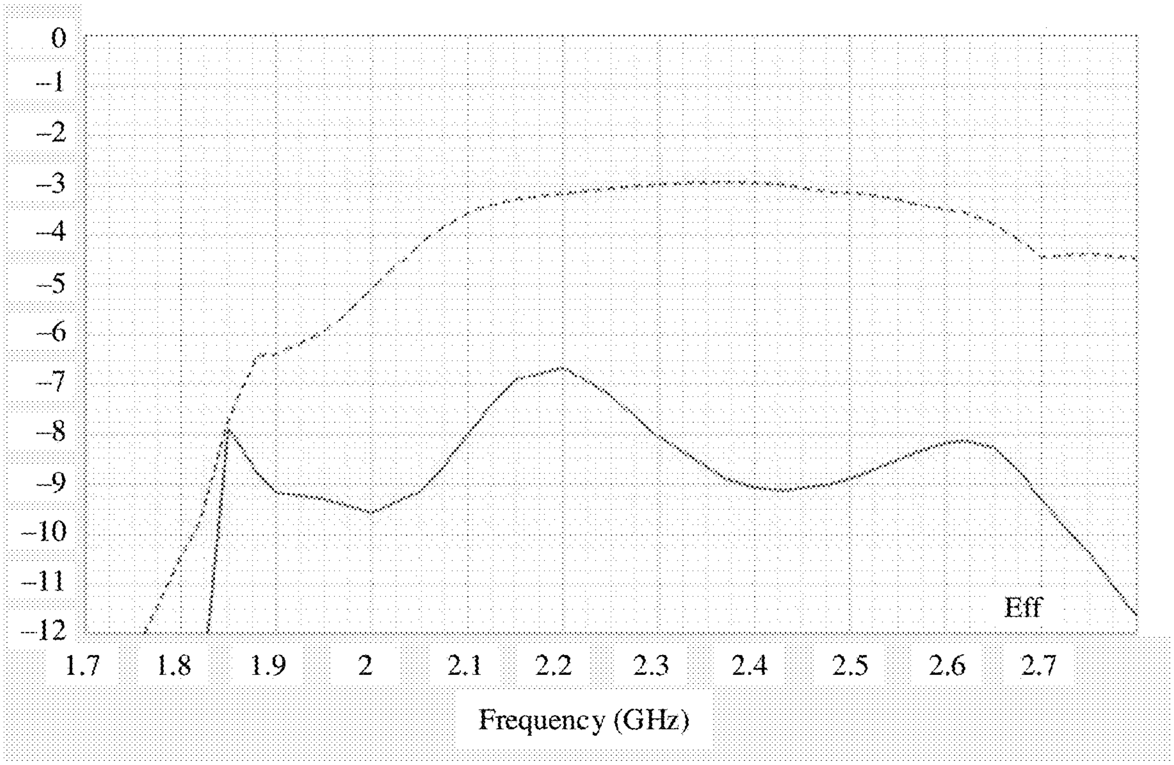

In some example implementations, a matching network optimization design (for example, optimizing an antenna reflection coefficient or impedance) may be performed at a feeding position in the coupling antenna structure in the examples shown in FIG. 11A and FIG. 11B. In this way, the coupling antenna structure may form wideband coverage of 1800 MHz to 2700 MHz (referring to FIG. 11G), and average efficiency of the coupling antenna structure may be greater than −9 dB (referring to FIG. 11H).

It can be learned that a coupling antenna structure formed by coupling a feeding antenna to the floating metal antenna may generate resonances of one or more Wi-Fi frequency bands (for example, the 2.4 GHz frequency band), and may further generate resonances of one or more mobile communications frequency bands (for example, LTE B3, LTE B1, and LTE B7).

The following describes example extended implementations in the foregoing embodiments.

A plurality of floating metal antennas may respectively form different coupling gaps with the feeding antenna.

In some embodiments, in a coupling antenna structure formed by coupling the feeding antenna to two or more floating metal antennas at the same time, different coupling gaps may be respectively formed between the two or more floating metal antennas and the feeding antenna (for example, the feeding support antenna 31).

Figure 12:
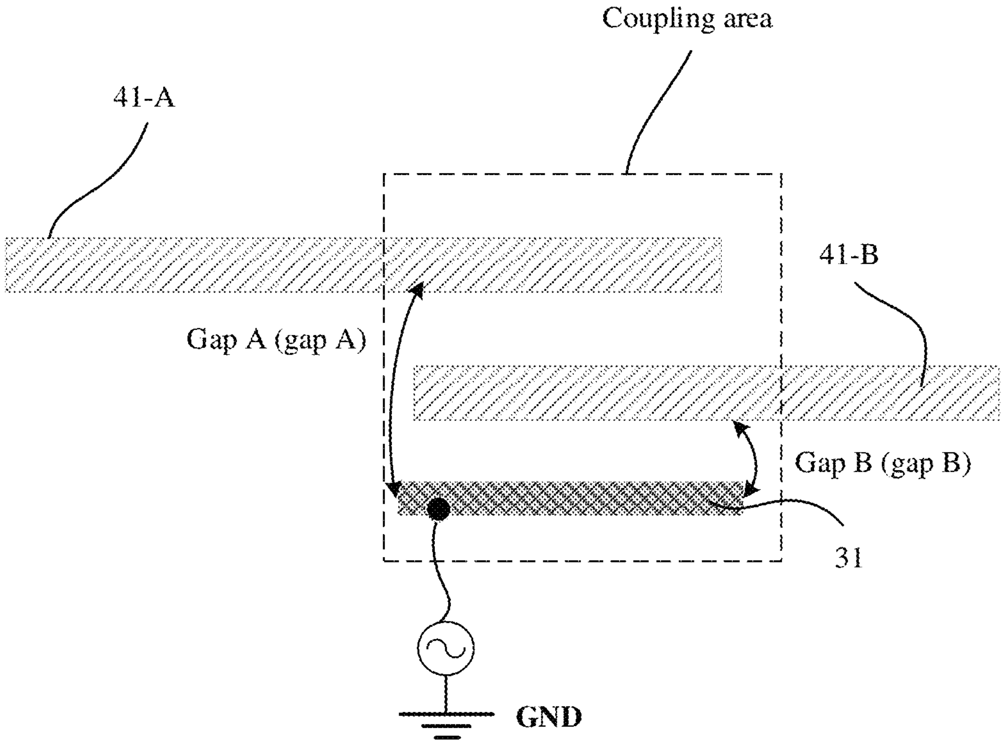
FIG. 12 is a schematic diagram of an antenna apparatus according to still another embodiment of this application.

For example, as shown in FIG. 12, a coupling gap A is formed between the feeding support antenna 31 and a floating metal antenna 41-A, and a coupling gap B is formed between the feeding support antenna 31 and a floating metal antenna 41-B. The coupling gap A may be different from the coupling gap B. The example is merely used to explain this application, and should not constitute a limitation.

The feeding antenna may have a plurality of antenna stubs.

In some embodiments, the feeding antenna (for example, the feeding support antenna or the feeding slot antenna) in the coupling antenna structure provided in this application may have a plurality of antenna stubs. The antenna stubs of the feeding support antenna may be represented as a plurality of radiation arms, and the antenna stubs of the feeding slot antenna may be represented as a plurality of radiation slots. The plurality of antenna stubs may further increase a quantity of resonances generated by the coupling antenna structure, and may further increase frequency bands covered by the antenna.

Figure 13A:
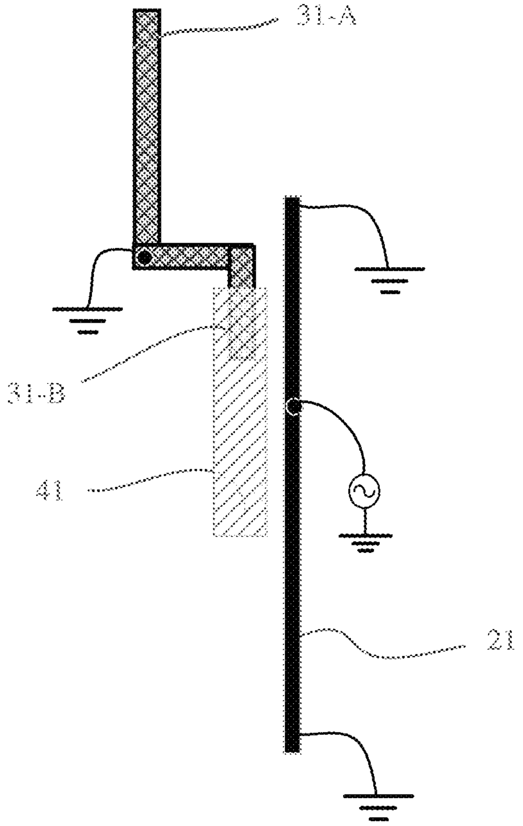
FIG. 13A and FIG. 13B are schematic diagrams of an antenna apparatus according to still other embodiments of this application.

For example, as shown in an example in FIG. 13A, the feeding support antenna 31 may have two antenna stubs: an antenna stub 31-A and an antenna stub 31-B. Each of the two antenna stubs may have one end being closed and grounded, and the other end being open. Both of the two antenna stubs can generate resonances with a quantity greater than that of resonances generated by a support antenna having a single antenna stub.

Figure 13B:
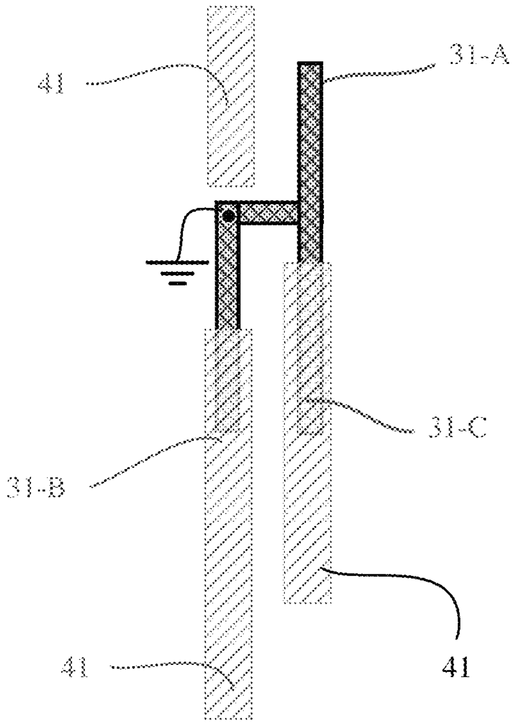

For another example, as shown in an example in FIG. 13B, the feeding support antenna 31 may have three antenna stubs: an antenna stub 31-A, an antenna stub 31-B, and an antenna stub 31-C. Each of the three antenna stubs may have one end being closed and grounded, and the other end being open. All the three antenna stubs can generate resonances with a quantity greater than that of resonances generated by a support antenna having a single antenna stub.

The example is merely used to explain this application, and should not constitute a limitation.

Related Extension of Floating Metal Antenna

In some embodiments, the floating metal antenna in the coupling antenna structure provided in this application may have a plurality of antenna stubs. The plurality of antenna stubs may further increase a quantity of resonances generated by the coupling antenna structure, and may further increase frequency bands covered by the antenna.

Figure 14A:
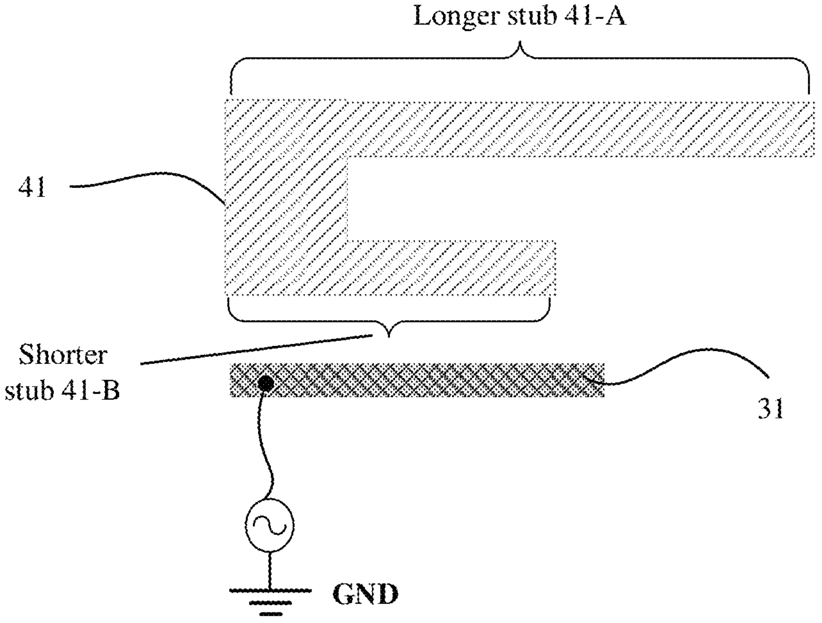
FIG. 14A to FIG. 14E are schematic diagrams of an antenna apparatus according to still other embodiments of this application.

For example, as shown in an example in FIG. 14A, the floating metal antenna 41 may have two antenna stubs: an antenna stub 41-A and an antenna stub 41-B. The two antenna stubs may generate different resonances. The example is merely used to explain this application, and does not constitute a limitation.

In some embodiments, the floating metal antenna may be divided into a plurality of parts, and the plurality of parts may be connected by using a distribution parameter or a lumped parameter inductor, to reduce a size of the floating metal antenna.

Figure 14B:
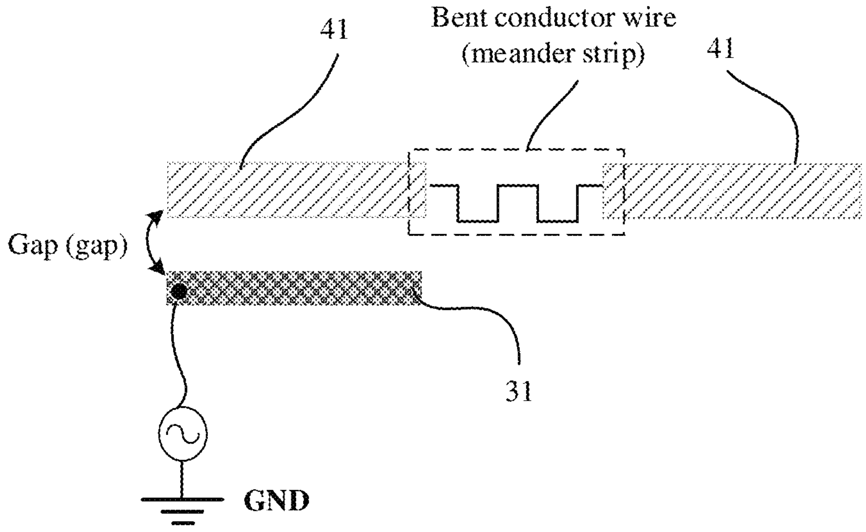
Figure 14C:
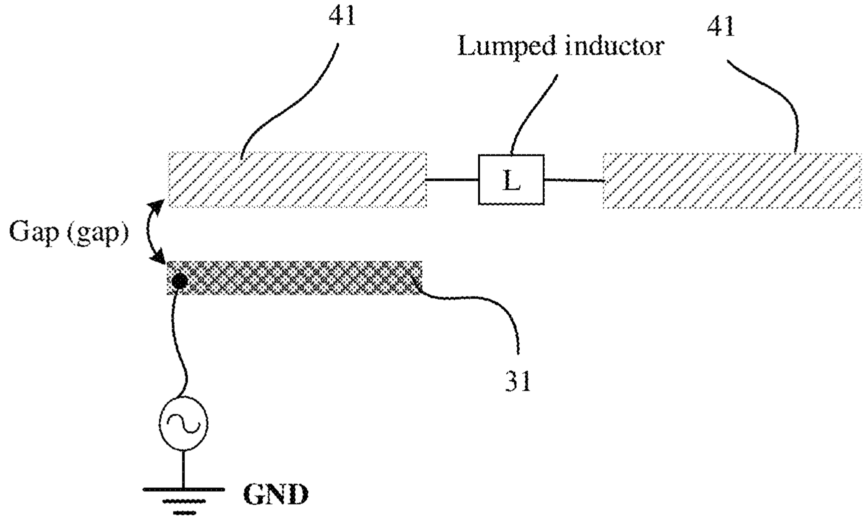

For example, as shown in FIG. 14B, the floating metal antenna may be divided into two parts, and the two parts may be connected by using a distributed parameter inductor (for example, a bent conductor wire). For another example, as shown in FIG. 14C, the floating metal antenna may be divided into two parts, and the two parts may be connected by using a lumped parameter inductor. The example is merely used to explain this application and shall not be construed as a limitation.

Figure 14D:
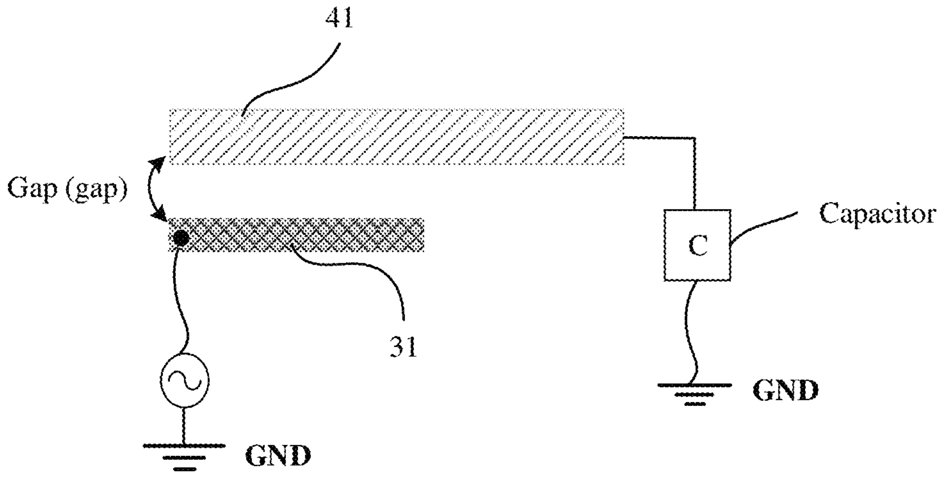

In some embodiments, as shown in FIG. 14D, an end of the floating metal antenna 41 may have a capacitor, so that a size of the floating metal antenna can be reduced.

Figure 14E:
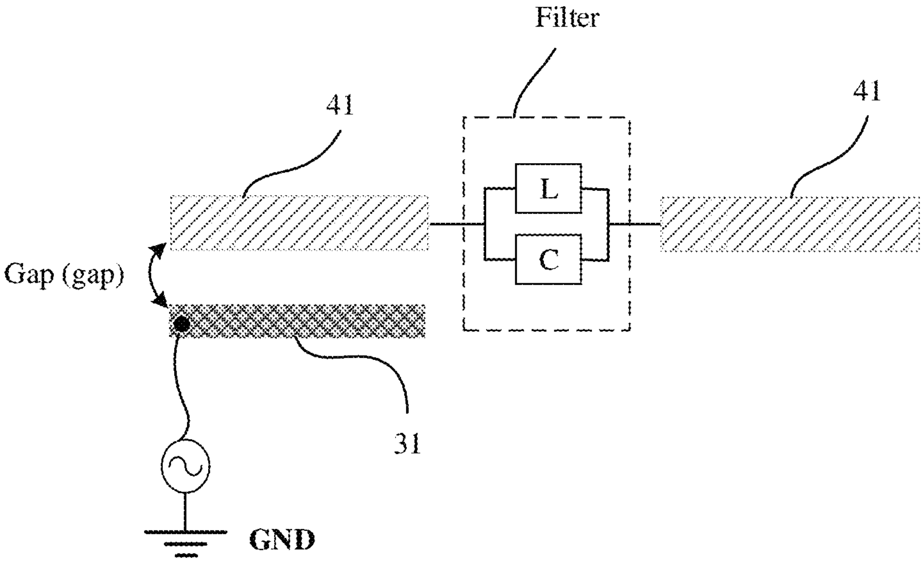

In some embodiments, as shown in FIG. 14E, a filter, such as a band-pass filter or a high-frequency filter, may be disposed inside the floating metal antenna, and may filter a signal radiated by the floating metal antenna, to implement a plurality of frequency bands.

It can be learned that the coupling antenna structure provided in the embodiments of this application may generate excitation of a plurality of resonance modes, so that antenna bandwidth and radiation characteristics can be improved. The coupling antenna structure may be implemented in limited design space, and the support antenna occupies very small space, thereby effectively saving antenna design space inside the electronic device. In addition, the structure of the coupling antenna does not affect an industrial design appearance of the electronic device, and there is no need to make an extra slot on a metal frame, thereby effectively reducing any impact on how the electronic device is held in hand.

The coupling unit in the coupling antenna apparatus provided in the embodiments of this application may be another antenna element that is disposed on the rear cover and that can be coupled to radiate a signal.

In this application, a wavelength in a wavelength mode (for example, a half-wavelength mode or a quarter-wavelength mode) of an antenna may be a wavelength of a signal radiated by the antenna. For example, a half-wavelength mode of the floating metal antenna may generate a resonance of a 2.4 GHz frequency band, where a wavelength in the half-wavelength mode is a wavelength of a signal radiated by the antenna in the 2.4 GHz frequency band. It should be understood that a wavelength of a radiation signal in the air may be calculated as follows: Wavelength=Speed of light/Frequency, where the frequency is a frequency of the radiation signal. A wavelength of the radiation signal in a medium may be calculated as follows: Wavelength=(Speed of light/$\sqrt{\varepsilon}$)/Frequency, where $\varepsilon$ is a relative dielectric constant of the medium, and the frequency is a frequency of the radiation signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
- a display;
- a metal middle frame;
- a printed circuit board with an antenna support;
- a rear cover, wherein the rear cover is made of a first insulating material;
- a feeding unit, wherein the feeding unit is fixed on the antenna support;
- a first coupling unit coupled to the feeding unit, wherein the first coupling unit is disposed on the rear cover and both ends of the first coupling unit are configured to be open without connecting to a power feed, the feeding unit and the first coupling unit are coupled on a first direction, wherein the first direction is perpendicular to a plane that is parallel to the display or the rear cover; and
- a second coupling unit coupled to the feeding unit, wherein the second coupling unit is disposed in the metal middle frame.

2. The electronic device according to claim 1, wherein the antenna support is made of a second insulating material.

3. The electronic device according to claim 2, wherein the second insulating material is PC/ABS.

4. The electronic device according to claim 1, wherein the feeding unit is disposed in parallel and opposite to the first coupling unit.

5. The electronic device according to claim 1, wherein the first coupling unit comprises a floating metal antenna.

6. The electronic device according to claim 5, wherein the floating metal antenna is disposed on an inner surface of the rear cover or an outer surface of the rear cover, or is embedded in the rear cover.

7. The electronic device according to claim 1, wherein one end of the feeding unit is configured to feed power, and the other end of the feeding unit is open.

8. The electronic device according to claim 1, wherein the first coupling unit and the feeding unit are arranged such that a projection of the first coupling unit on the first direction overlaps with the feeding unit.

9. The electronic device according to claim 1, wherein the electronic device further comprises a metal frame without a slot.

10. The electronic device according to claim 1, wherein the electronic device further comprises:
- a third coupling unit, wherein the third coupling unit is disposed on the rear cover, both ends of the second coupling unit are configured to be open without connecting to a power feed, and the feeding unit is coupled with the third coupling unit on the first direction.

11. An electronic device, comprising:
a display;
a metal middle frame;
a printed circuit board with an antenna support;
a rear cover, wherein the rear cover is made of a first insulating material;
a feeding unit, wherein the feeding unit is fixed on the antenna support;
a first coupling unit coupled to the feeding unit, wherein the first coupling unit is disposed on the rear cover and both ends of the first coupling unit are configured to be open without connecting to a power feed, the feeding unit and the first coupling unit are coupled on a first direction, wherein the first direction is perpendicular to a plane that is parallel to the display or the rear cover,
wherein the first coupling unit further comprises a slot antenna formed by slitting on the metal middle frame; and
wherein the antenna support is coupled to one or more antenna elements disposed on the rear cover and the slot antenna to generate resonances of a plurality of frequency bands.

12. The electronic device according to claim 11, wherein the feeding unit is disposed in parallel and opposite to the slot antenna.

13. An electronic device, comprising:
a display;
a metal middle frame;
a printed circuit board with an antenna support;
a rear cover, wherein the rear cover is made of a first insulating material;
a feeding unit, wherein the feeding unit is fixed on the antenna support;
a first coupling unit coupled to the feeding unit, wherein the first coupling unit is disposed on the rear cover and both ends of the first coupling unit are configured to be open without connecting to a power feed, the feeding unit and the first coupling unit are coupled on a first direction, wherein the first direction is perpendicular to a plane that is parallel to the display or the rear cover,
wherein the feeding unit is a feeding slot antenna, and the feeding slot antenna is formed by slitting on the metal middle frame; and
wherein the feeding slot antenna is coupled to one or more antenna elements disposed on the rear cover to generate resonances of a plurality of frequency bands.

14. The electronic device according to claim 13, wherein the feeding slot antenna is disposed in parallel and opposite to one or more antenna elements disposed on the rear cover.

15. The electronic device according to claim 1, wherein the first coupling unit coupled to the feeding unit is configured to generate resonances of a first plurality of frequency bands and the second coupling unit coupled to the feeding unit is configured to generate resonances of a second plurality of frequency bands.

16. The electronic device according to claim 15, wherein the first and second plurality of frequency bands comprise a Wi-Fi frequency band and/or a mobile communication frequency band.

17. The electronic device according to claim 1, wherein the second coupling unit is a slot antenna formed by slitting on the metal middle frame.

18. The electronic device according to claim 17, wherein the feeding unit is disposed in parallel and opposite to the slot antenna.

19. The electronic device according to claim 11, wherein the first coupling unit comprises a floating metal antenna.

20. The electronic device according to claim 13, wherein the first coupling unit comprises a floating metal antenna.

* * * * *